(12) United States Patent
Righetto et al.

(10) Patent No.: US 10,706,212 B1
(45) Date of Patent: Jul. 7, 2020

(54) CROSS-PLATFORM PRESENTATION OF DIGITAL CONTENT

(71) Applicant: Amazon Technologies, Inc., Seattle, WA (US)

(72) Inventors: Augusto Cesar Righetto, Kirkland, WA (US); Thomas Grant Fraser, Edmonds, WA (US); Lokesh Joshi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/811,561

(22) Filed: Nov. 13, 2017

Related U.S. Application Data

(63) Continuation of application No. 14/089,477, filed on Nov. 25, 2013, now Pat. No. 9,846,682.

(51) Int. Cl.
*G06F 3/048* (2013.01)
*G06F 40/106* (2020.01)

(52) U.S. Cl.
CPC .................................. *G06F 40/106* (2020.01)

(58) Field of Classification Search
CPC ........ G06F 9/542; G06F 9/44526; G06F 8/36; G06F 9/443; G06F 9/45504; G06F 2209/545; G06F 8/38; G06F 17/30905; G06F 17/212; G06F 3/0481; G06F 3/0482; G06F 17/30716; G06F 40/106
See application file for complete search history.

(56) References Cited

U.S. PATENT DOCUMENTS

| | | | |
|---|---|---|---|
| 6,734,873 B1 | 5/2004 | Herf et al. | |
| 7,266,810 B2 * | 9/2007 | Karkare | G06F 11/3466 714/E11.2 |
| 7,415,270 B2 * | 8/2008 | Wilhelmsson | G06F 9/545 455/414.1 |
| 8,104,044 B1 | 1/2012 | Scofield et al. | |

(Continued)

OTHER PUBLICATIONS

Coles, "Canvas Composite Operations Tutorial & Demo", retrieved on Dec. 11, 2015, at h!lp:flmr coles.corniblog/canvas-composile-operntions-demo-anima!ion!., 2010, 3 pages.

(Continued)

*Primary Examiner* — Wilson W Tsui
(74) *Attorney, Agent, or Firm* — Lee & Hayes, P.C.

(57) ABSTRACT

In some examples, additional content is provided with the main content of a content item presented on an electronic device. For instance, an occurrence of an event may call for presentation of an additional content portion concurrently with the main content of the content item. The additional content portion may interact with other additional content portions, the main content portion, and/or user inputs. In some cases, the additional content portion can be implemented by one or more plug-in modules having designated roles for providing respective different types of additional content. Accordingly, some examples provide a cross-platform module that receives events, selects one or more plug-ins in response to a received event, and causes the one or more plug-ins to perform a desired action for rendering and compositing additional content portions or features to be presented with the main content of a content item.

20 Claims, 14 Drawing Sheets

(56) References Cited

U.S. PATENT DOCUMENTS

| | | | |
|---|---|---|---|
| 8,250,477 | B1 | 8/2012 | Schwarzberg et al. |
| 8,271,608 | B2 * | 9/2012 | Mahaffey ............... G06F 15/16 370/217 |
| 9,009,739 | B2 * | 4/2015 | Labour ............... G06F 9/44526 719/328 |
| 2003/0126311 | A1 * | 7/2003 | Kushnirskiy ....... G06F 9/44526 719/328 |
| 2003/0177286 | A1 | 9/2003 | Gould |
| 2007/0101291 | A1 | 5/2007 | Forstall et al. |
| 2008/0016520 | A1 * | 1/2008 | Kong ................. G06F 9/44526 719/329 |
| 2008/0127171 | A1 * | 5/2008 | Tarassov ................. G06F 8/60 717/174 |
| 2008/0127179 | A1 * | 5/2008 | Moss ....................... G06F 8/61 717/175 |
| 2008/0189651 | A1 | 8/2008 | Reveman |
| 2008/0307385 | A1 | 12/2008 | Dreiling et al. |
| 2008/0313540 | A1 | 12/2008 | Dirks et al. |
| 2009/0249282 | A1 | 10/2009 | Meijer et al. |
| 2009/0249393 | A1 | 10/2009 | Shelton et al. |
| 2011/0197165 | A1 | 8/2011 | Filippov et al. |
| 2014/0013251 | A1 | 1/2014 | Zafar et al. |
| 2014/0078134 | A1 * | 3/2014 | Kainiemi .............. G06F 3/0483 345/419 |
| 2014/0096046 | A1 | 4/2014 | Zhong et al. |

OTHER PUBLICATIONS

Final Office action for U.S. Appl. No. 14/089,477, dated May 19, 2017, Righetto et al., "Cross-Platform Presentation of Digital Content", 34 pages.

Goodman, "Javascript and DHTML Cookbook", O'Reilly Publishing, 2003, pp. 227-2028.

Office action for U.S. Appl. No. 14/089,477, dated Nov. 4, 2016, Righetto et al., "Cross-Platform Presentation of Digital Content", 30 pages.

Office action for U.S. Appl. No. 14/089,477, dated Dec. 21, 2015, Righetto et al., "Cross-Platform Presentation of Digital Content", 28 pages.

Office action for U.S. Appl. No. 14/089,477, dated Jul. 14, 2016, Righetto et al., "Cross-Platform Presentation of Digital Content", 31 pages.

* cited by examiner

CROSS-PLATFORM PRESENTATION OF DIGITAL CONTENT

CROSS-REFERENCE TO RELATED APPLICATION

This application is a continuation of, and claims priority to, U.S. patent application Ser. No. 14/089,477, entitled "CROSS-PLATFORM PRESENTATION OF DIGITAL CONTENT", filed on Nov. 25, 2013, of which is fully incorporated by reference herein.

BACKGROUND

The continued proliferation of digital content items has led to an increase in the availability of digital content items, as well as an increase in the number and availability of electronic devices used for consuming these content items. For instance, users may consume digital content items, such as electronic books (eBooks), videos and music, on a large assortment of electronic devices. As the number of content items and electronic devices for consuming content items continues to increase, enhancing the user experience can be beneficial for both the consumers and the providers of content items and electronic devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
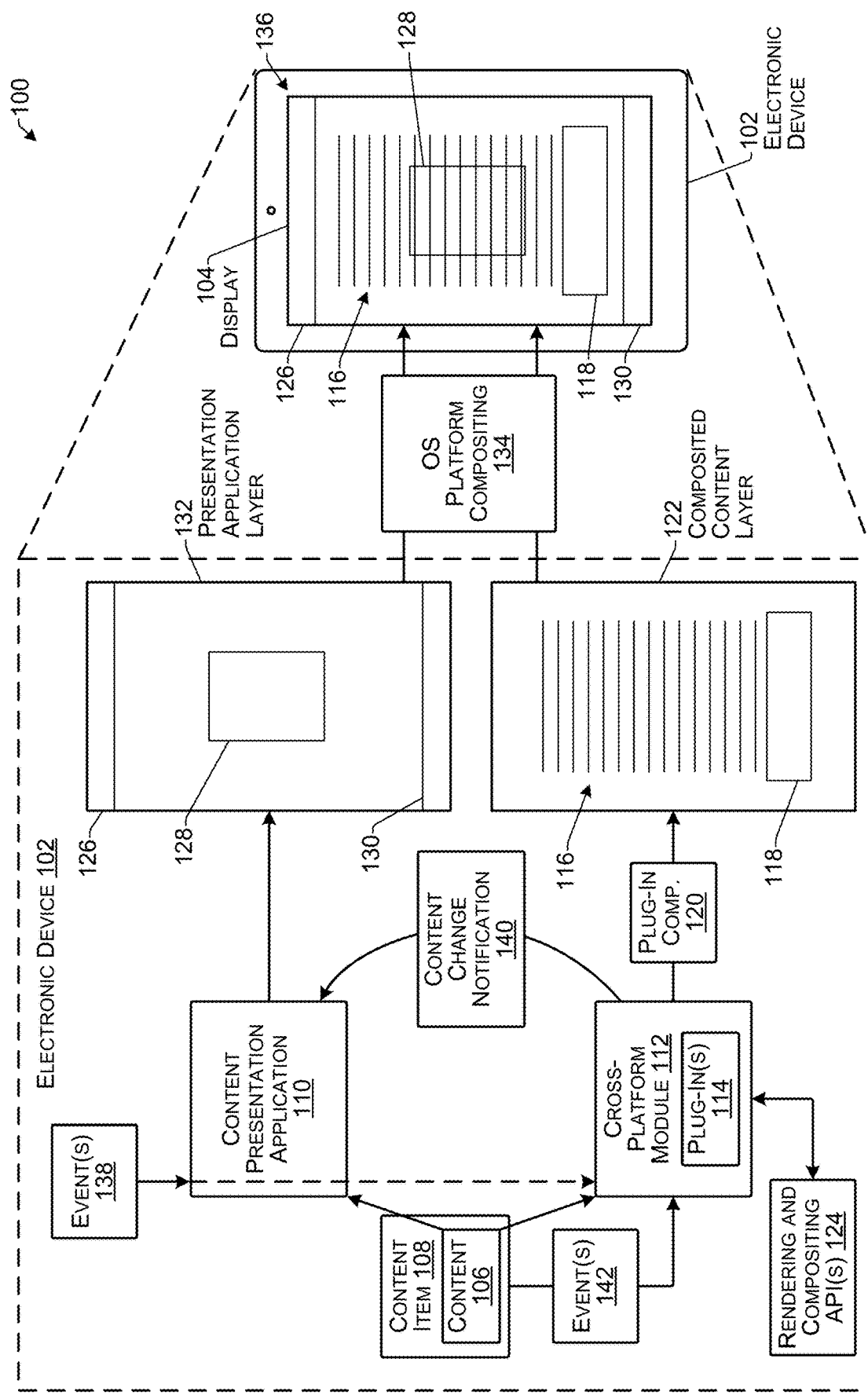
FIG. 1 illustrates an example content presentation framework according to some implementations.

Some implementations herein include techniques for rendering and compositing content presented on an electronic device. In some instances, the techniques enable rich interactivity with content items, such as by allowing on-demand access to various different content types and interactive features from within a content item. For example, an occurrence of an event may call for execution of an extension, a widget, a window, a content-enhancing feature, or other additional content portion inside the main content of the content item. The additional content portion can interact with other additional content portions, the main content portion, and/or user inputs. In some cases, the additional content portion can be implemented by one or more platform-generic plug-in modules ("plug-ins") having designated roles for providing respective different types of additional content. The plug-ins can extend and/or enhance the functionality of core code (e.g., software and/or firmware) and/or hardware that implements the plug-ins without requiring changes to the core code and/or hardware. Thus, some examples provide plug-ins that can be used with a cross-platform module, which may receive events, select one or more plug-ins for receiving the received event, and cause the one or more plug-ins to perform a desired action for rendering and compositing additional content portions or features to be presented with the main content of a content item.

Some implementations provide an architecture including a cross-platform module that renders interactive content or other additional content along with the text content of an eBook. For example, complex gestures, such as pan, zoom, swipe, etc., can be handled by a rendering layer of the cross-platform module, rather than being handled by a presentation application, such as a reader application or a preview application. Further, the cross-platform module can implement plug-ins on demand for providing widgets, viewers, windows or other additional content within the content of an electronic book, such as for providing content-enhancing features that include panorama views, slideshows, scrollable frames, image sequences, buttons, webviews, hyperlinks, animation panels, zoomable panels, automatic reorientation of two-page spreads, read alongs, write-ins for textbooks, quizzes, video content and/or audio content. In addition, the content items herein are not limited to electronic books, but may also include other types of content items such as video recordings (e.g., movies and TV shows), audio recordings (e.g., music, voice recordings), applications (e.g., mobile apps), and so forth. Thus, the additional content described herein may be rendered and composited with the content of these other types of content items as well. Furthermore, while some examples are described in the context of outputting an image for presentation on a display, other examples may include outputting an image that is presented by printing on a printer, or presented on or by other types of output devices (such as a projector), or outputting a rendered and composited image for various other purposes.

The architecture herein is able to provide a homogeneous reading and interactive experience across a variety of operating system (OS) platforms and electronic devices. Examples of several suitable OS platforms include Android®, Windows®, Mac OS® (e.g., OS X®), iOS® and Linux®. In some implementations, the cross-platform module may be platform-generic or cross-platform-compatible, i.e., useable across multiple different OS platforms, while the presentation application may be platform-specific, i.e., configured for operation on a particular type of OS platform. Further, some instances include a separation of the respective tasks of the cross-platform module and the presentation application. For example, if a feature renders within or interacts with the content of the content item, the feature is rendered and composited by the cross-platform module.

The cross-platform module may render and composite its own composited content layer in the platform graphics hierarchy. For instance, the cross-platform module may handle detected events directly and render corresponding content to its own platform layer. Thus, the cross-platform module can optimize the rendering of a page of a content item. Subsequently, the cross-platform module only updates those components or areas of the page that need to be updated, rather than updating or refreshing the entire page. This technique may be referred to as direct rendering, which allows the cross-platform module to maintain higher frame rates for presenting content than would otherwise be the case if the entire page or frame were updated.

Furthermore, complex user interface (UI) gestures can be handled by the cross-platform module directly, rather than by the presentation application. For instance, user input with respect to a presented image may bypass the presentation application to be provided directly from the OS to the cross-platform module (or the platform view thereof). This avoids complexities of having different presentation applications for different platforms managing complex gestures. For example, if the presentation application were to manage the events directly, then the presentation application may need logic on how to apply gestures to each plug-in type and may need knowledge of how each plug-in works. With the cross-platform module herein, however, each plug-in is able to manage its own events and rendering, such as when responding to UI gestures or other detected events.

Additionally, in some instances, the cross-platform module may handle some or all content rendering and interaction. This arrangement can provide a clear separation of responsibilities between the cross-platform module and the presentation application. Thus, the cross-platform module may include a plug-in manager responsible for managing rendering and events among plug-ins.

The cross-platform module may also provide respective platform-specific interfaces for a plurality of different OS platforms. Thus, the cross-platform module may provide a different platform view for each different platform, the role of which is to expose the cross-platform module's functionality to that platform using platform-specific constructs. The platform view may also convert events from platform-specific gestures to cross-platform events that can be recognized by the cross-platform module and routed to the appropriate subset of plug-ins.

Furthermore, the cross-platform module may use both cross-platform plug-ins and platform-specific plug-ins to enable complex content categories. Accordingly, the cross-platform module can provide a consistent cross platform interface on a plurality of different platforms (e.g., Android®, Windows®, Mac OS® (e.g., OS X®), iOS® and Linux®). The responsibilities of the cross-platform module may include direct rendering, compositing and event handling. For instance, the cross-platform module may employ one or more plug-ins to render content directly to the display of an electronic device, which removes this function from platform specific presentation applications. This can enable high frame-rates for interactivity, along with good performance and memory utilization.

In addition, compositing may refer to the act of combining two or more rendered layers into a single image to be displayed. Each plug-in associated with the cross-platform module can render its content to a separate plug-in layer, and the cross-platform module is configured to composite these plug-in layers to present composited content on the display. This arrangement provides support for various UI navigation features, such as enabling a user swipe on and swipe off additional layers of complementary content on top of displayed digital content.

In some cases, plug-in layer compositing by the cross-platform module may be performed using a cross-language, multi-platform, rendering application programming interface (API), such as open OpenGL® ES 2.x, or other suitable rendering library. Accordingly, each plug-in can render to its own respective plug-in layer independently and in parallel, and then the rendering and compositing API may be used to composite the plug-in layers to generate a composited plug-in layer compatible with a corresponding platform. Subsequently, compositing of all layers for presentation on the display, such as an OS layer, the cross-platform module's composited content layer, and the presentation application layer, may be performed by standard platform compositing of the corresponding OS.

In addition, the cross-platform module may receive and manage events, such as events resulting from user gestures and other user interactions, as well as events generated internally, such as from the content of the content item, the plug-ins, the presentation application, or any other module, so that the various plug-ins can update respective portions of the plug-in content that they are providing to the display, as appropriate, based on these incoming events. As one example, events that are associated with a presentation application region of the display are handled by the presentation application, and events that are associated with the rendered plug-in content regions of the display may be handled by the cross-platform module. Accordingly, the cross-platform module is able to handle events directly and independently of the presentation application. As one example, this enables the cross-platform module to provide fast interactive responses for content-enhancing features such as panning, zooming, displaying image sequences, and so forth.

For discussion purposes, some example implementations and architectures are described herein in the context of rendering and presenting additional content for electronic books and other content items. However, implementations herein are not limited to the particular examples provided, and may be extended to other implementations and architectures, and other types of content items, as will be apparent to those of skill in the art in light of the disclosure herein.

FIG. 1 illustrates an example rendering and presentation framework 100 according to some implementations. In this example, an electronic device 102 includes a display 104 upon which content 106 of a content item 108 may be presented. Examples of the electronic devices 102 according to some implementations herein may include at least one of: digital media devices and eBook readers; tablet computing devices; desktop or workstation computing devices; smart phones and mobile communication devices; laptop and netbook computing devices; as well as various other different types of electronic devices, examples of which may include wearable computing devices or glasses, gaming systems, televisions, and any other electronic device capable of rendering and presenting digital content items according to the techniques described herein.

Further, in some implementations, the content item 108 may be an electronic book (eBook) having one or more pages of text. For example, the display 104 may display the text of the eBook and also any illustrations, tables, maps, or graphic elements that might be contained in or included with the eBook, and also any of the other types of additional content or content-enhancing features described herein. The terms "electronic book" and/or "eBook," as used herein, include electronic or digital representations of printed works, as well as digital content that may include text, multimedia, hypertext, and/or hypermedia. Examples include, but are not limited to, digital representations of books, magazines, newspapers, periodicals, journals, reference materials, textbooks, anthologies, instruction manuals, proceedings of meetings, folios, forms, directories, plays, screen plays, closed captioning transcripts of movies and television shows, song lyrics, webpage content, and so forth. Accordingly, the content items 108 herein may include any readable or viewable textual content that is in electronic or digital form. Additionally, some implementations are not limited to text items, but may also include other types of content items 108, such as digital audio (e.g., music, audio books, etc.), digital video (e.g., movies, television, short clips, etc.), images (e.g., art, photographs, etc.), and multimedia content. In some examples, the users may employ electronic devices 102 that include the display 104, while in other examples the electronic devices 102 do not include a display, but rather include one or more other types of output components, such as speakers for outputting audio, or the like.

In the example of FIG. 1, a content presentation application 110 may be activated by a user of the electronic device 102 to cause presentation of the content 106 of the content item 108 on the display 104 of the electronic device 102. In some cases, the content presentation application 110 is a platform-specific application, such as a reader application, a preview application, or a media player application configured to present the content 106 on the electronic device 102, which may have a particular type or version of an OS running thereon.

To present the content 106 on the display 104, the content presentation application 110 may call a cross-platform module 112. The cross-platform module 112 may include one or more cross-platform-compatible plug-ins 114 that are configured to render one or more portions of the content 106 based on a current event. Thus, in response to an event for opening the content item, the plug-ins 114 may render one or more portions of content for presentation on the display 104. As one example, the plug-ins 114 may render a first portion of content 116 and a second portion of content 118. In some instances, the two portions of content 116 and 118 may be rendered by two separate plug-ins 114 as separate plug-in layers or images (not shown in FIG. 1). As illustrated at 120 the separate plug-in layers may be subsequently composited into a composited content layer 122 by the cross-platform module 112 and stored in an off-screen buffer (not shown in FIG. 1).

As mentioned above, the cross-platform module 112 may employ one or more rendering and compositing libraries or APIs 124 for rendering and compositing the content portions 116 and 118 handled by the plug-ins 114. An example of a suitable rendering and compositing API 124 may include OpenGL® ES 2.x. For example, OpenGL® ES 2.x is a cross-language, cross-platform API for full-function 2D and 3D graphics, such as on embedded systems. OpenGL® ES 2.x consists of well-defined subsets of desktop OpenGL®, and may create a low-level interface between software and graphics acceleration, such as may be performed by a graphics processing unit (GPU). For instance, OpenGL® ES 2.x can enable fully programmable 3D graphics, and includes the EGL™ (Embedded-System Graphics Library) specification for portably binding to native windowing systems. The OpenGL® ES 2.x API is defined as a number of functions that may be called by a client program. OpenGL® ES 2.x is available on a variety of platforms, including Android®, Windows®, Mac OS® (e.g., OS X®), iOS® and Linux®, either natively or through other third party libraries. For instance, with respect to Windows® platforms, a translation library may be provided that translates between the Open GL® ES 2.x library and DirectX® on Windows®.

In some examples, the cross-platform module 112 may use the rendering and compositing API(s) 124 for hardware-accelerated rendering in conjunction with a GPU (not shown in FIG. 1). In other examples, a central processing unit (CPU) or other processor may emulate the functions of a GPU. The rendering and compositing API(s) 124 may interact with the GPU to achieve hardware-accelerated rendering and compositing compatible with a plurality of OS platforms of different types. Thus, when the cross-platform module 112 is installed on an electronic device 102 running a particular OS, the cross-platform module 112 is able to render and composite a composited content layer 122 that is compatible with, and useable by, the particular OS.

In some instances, all content rendering and interactivity may be encapsulated within the cross-platform module 112, which enables simplification and reduction in size of the code of the platform-specific presentation application 110. Examples of functions performed by the cross-platform module 112 include rendering a page of text content, animating page transitions, rendering embedded multimedia, drawing selection, highlighting portions of text, inserting annotations into the content, magnification, handling events internal to content, and various other content-enhancing features as enumerated previously. For example, the cross-platform module 112 may receive an event, such as from the content itself, or from a user input, and may direct, route or otherwise send the event to the appropriate plug-in(s) 114 for responding to the event.

As one example, in FIG. 1, suppose that the content portion 116 is the main content of the content item 108, such as text of an electronic book, and the content portion 118 is an additional portion of content for enhancing the user experience, such as an interactive window, a slideshow, a 3D model, etc., that is rendered by a separate one of the plug-ins 114, and that may have a life cycle that is independent of that of the content portion 116. As one example, the content of the electronic book may issue an event to instruct presentation of the content portion 118, such as in conjunction with a page turn event to present a new page that includes the main content portion 116. As another example, a user input may cause presentation of the content portion 118. For example, when the page of the electronic book that includes content portion 116 is initially presented, an icon or other graphic element may be presented rather than the content portion 118. For instance, the icon may indicate to the user that additional content is available. The user may select the icon, which may result in the cross-platform module 112 receiving an event to cause a corresponding plug-in 114 to present the content portion 118. Accordingly, content portions may be loaded or unloaded on demand based on events such as events resulting from user inputs, events from the content, or events caused by other plug-ins.

The content presentation application 110 may also present certain features, such as UI features 126, 128 and 130. Thus, the content presentation application 110 may provide a separate presentation application layer 132 that provides user interface features of the presentation application 110 for presentation on the display 104. As indicated at 134, the OS of the electronic device 102 may perform platform-level compositing of the presentation application layer 132, the composited content layer 122, and an OS layer (not show in FIG. 1) that may include any rendered features of the OS that are to be presented on the display 104 concurrently with the content item. Accordingly, an assembled composited image 136 may be presented on the display 104 that includes the rendered content portions 116 and 118, as well as the presentation application UI features 126, 128 and 130, and any OS features (not shown in FIG. 1).

As mentioned above, the cross-platform module 112 is able to directly handle one or more events 138. In some instances, events that are associated with a presentation application region, e.g., the UI features 126, 128 or 130, are handled by the presentation application 110, and events that are associated with the content regions presented on the display by the plug-ins, e.g., corresponding to content portions 116 and 118 in this example, may be handled by the cross-platform module 114. Handling of events associated with overlapped regions, such as at 128, may be determined based on the type of event or other suitable logic. Several examples of events may include events resulting from the user requesting to turn a page of an electronic book, the user selecting text or other portion of a content item, the user selecting an icon or graphic element presented on the display, the user adjusting a setting for presenting a content item, and/or the user providing an input via an input device. For example, the OS may receive an input signal, such as from an input device (e.g., touch screen, mouse, control button, etc.), and in response, the OS may pass an event to the platform view (not shown in FIG. 1) discussed further below, which acts as a platform-specific interface between the cross platform module 112 and the OS and/or presentation application 110. The event may include information regarding the type of input signal received, such as a type of gesture and an input location on a display, a type of input device control activation, timing of the control activation, or other relevant information for identifying the input signal received in a manner that may be cross-platform generic.

When an event 138 is received, e.g., from the OS as a result of the OS receiving an input signal, such as from a user input, or based on other types of input signals, such as from the content item or the plug-ins, as discussed below, the event 138 may be provided directly to the cross-platform module 112. In some cases, the event may be provided to the platform view of the cross-platform module 112, which may translate the event in some cases, such as in the case that the cross-platform module 112 would not recognize the event properly. The platform view then may pass the event to the cross-platform module 112. In some instances, a plug-in manger of the cross-platform module 112 passes the event 138 to one or more of the plug-ins 114, which perform an action in response to the event 138, such as by rendering content to a corresponding plug-in layer. The one or more plug-in layers may be subsequently composited with the composited content layer 122, which in turn is composited with the assembled composited image 136. For example, when the event 138 calls for an update to one or more portions of content or addition of new content, a content change notification 140 may be passed to the content presentation application 110 and/or to the OS of the electronic device 102. This results in updating of the assembled composited image 136, such as by updating just the portion of the composited image 136 that includes updated or new content.

Further, as mentioned above, the content item 108 may include instructions or code as one or more input signals corresponding to one or more events 142 that may cause one or more plug-ins 114 to be executed to render content. For example, when the user turns a page, the new page may include cause an input signal for one or more events 142, such as an instruction for a particular plug-in 114 to render an additional portion of content for presentation with the main content at a particular location on the new page. Accordingly, a portion of the content item 108 may cause an input signal corresponding to an event 142 that is provided to a plug-in manager of the cross-platform module 112. As one example, suppose that turning to the new page produces an input signal for displaying a slideshow with the content of the page. The input signal may correspond to an event from the content item that can be provided directly to the plug-in manager of cross-platform module 112. In this case, the event 142 includes information regarding the type of content to be output (e.g., slideshow, panorama, etc., a location on the display or the output image at which the content should be rendered, and an identification of the content to be rendered (i.e., where the appropriate plug-in should obtain the content for rendering). In some examples, the presentation application 110 may parse the content 106 of the content item 108 to generate the event 142. In other examples, the cross-platform module 112 or a plug-in 114 may parse the content 106 of the content item 108 to generate the event 142.

As still another example, as discussed additionally below, an event may correspond to an input signal received from a plug-in in response to an earlier event. For example, a first plug-in may receive a first event, and may render a portion a portion of content based on the first event. Additionally, the first plug-in may generate an input signal that serves as a second event for a second plug-in. For example, the second event may be sent to one or more plug-ins that may determine whether to consume the second event based on a list of events maintained by each respective plug-in. If the second event matches the events listed for one of the plug-ins, that plug-in may consume the event by responding to the second event and rendering a portion of content for output.

Figure 2:
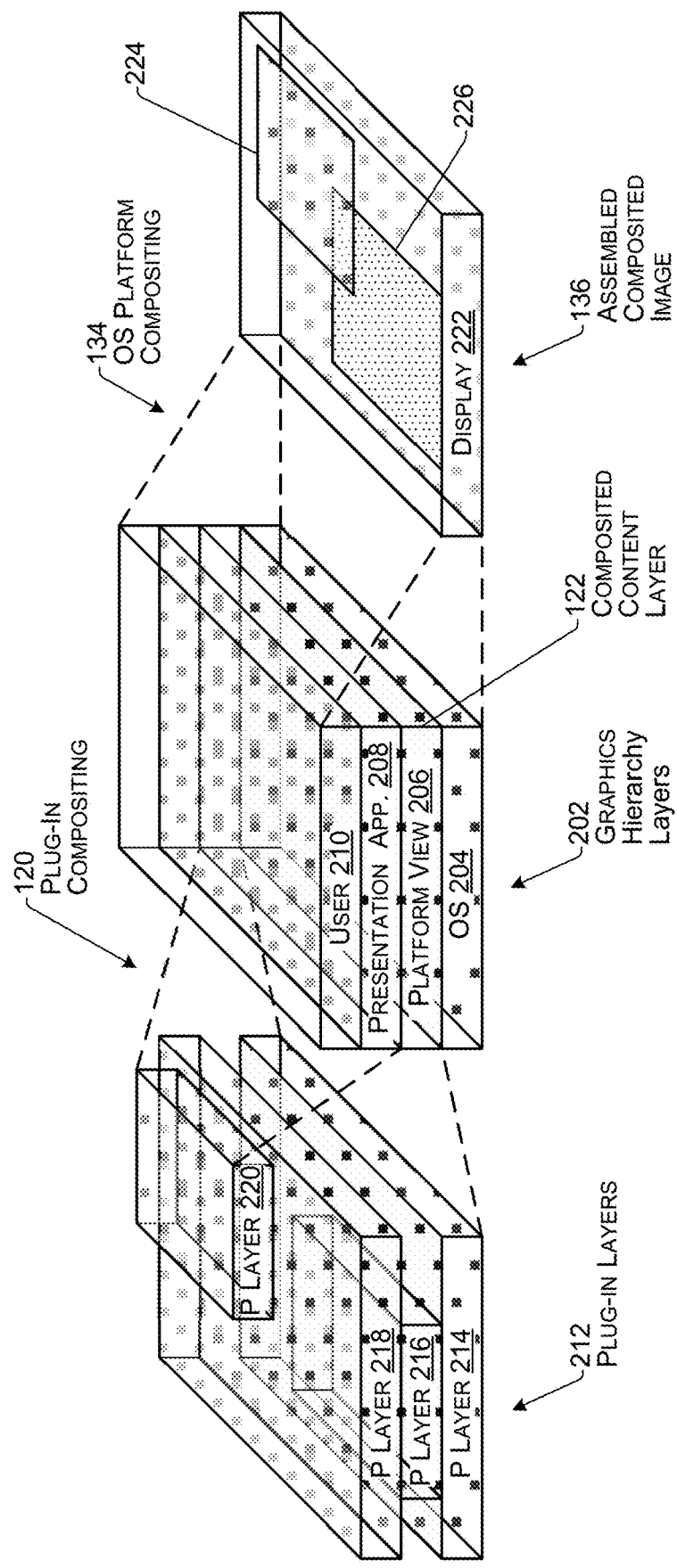
FIG. 2 illustrates an example rendering layer arrangement according to some implementations.

FIG. 2 illustrates an example layer relationship arrangement 200 according to some implementations. The layer relationship arrangement 200 includes a representation 202 of graphics hierarchy layers, which may include an OS layer 204, a platform view layer 206, a presentation application layer 208, and a user layer 210. As mentioned above, the cross-platform module 112 (not shown in FIG. 2) may present a platform view corresponding to the platform view layer 206 to the presentation application 208. There may be a separate implementation of the platform view for each different platform supported by the implementations herein. Thus, the platform view for each platform exposes the functionality of the cross-platform module 112 to the presentation application that runs on the corresponding OS platform. Consequently, the presentation application layer 208 is able to reside above the platform view layer 206, and the presentation application does not have to manage the events and rendering complexities in the content of a content item. In some instances, the platform view may drive the rendering for the cross-platform module 112 and may also convert detected events from platform-specific gestures to cross-platform events that can be consumed by the cross-platform module.

In addition to the platform view layer 206, the graphics hierarchy layers 202 may include an OS layer 204 that may include a rendering of any OS features to be displayed. Further, a presentation application layer 208 may include any rendered application UI elements, such as those discussed above with respect to FIG. 1. The user layer 210 may represent transient OS features that may be presented due to user inputs. Examples of such transient OS features may include UI features that can be swiped on and off the screen based on user input, or the like.

As discussed with respect to FIG. 1, when the cross-platform module 112 receives an event, such as a book-open event, a page-turn event, a user input to an area of a display, etc., the event may be directed to one or more of the plug-ins, such as to a subset of the plug-ins that are configured for handling the particular event. In some examples, as discussed additionally below, the event may be published to the plug-ins, which may each be configured to determine independently whether they should respond to the event. Accordingly, a subset of the plug-ins may respond to the event. In other examples, the cross-platform module 112 may include a management function that directs the event to a particular subset of one or more of the plurality of plug-ins in response to receiving the event and/or determining the type of the event.

In response to receiving the event, the one or more plug-ins may render content to a stack or group of one or more plug-in layers 212. For example, a first plug-in may render content to a first plug-in layer 214, a second plug-in may render content to a second plug-in layer 216, a third plug-in may render plug-in content to a third plug-in layer 218 and a fourth plug-in may render content to a fourth plug-in layer 220. In some examples herein, rendering content to a layer may include creating a separate image of the content that is at least initially separate from images (layers) rendered by others of the plug-ins. In some examples, the content itself may dictate the order or position of each plug-in layer in the stack of plug-in layers 212. For example, the event may instruct a plug-in where to obtain the content to render, and may further inform the plug-in of a Z-order of each plug-in layer in the stack of plug-in layers. Further, while a single stage of plug-in layers 212 is shown in FIG. 2, in other examples, multiple stages of plug-in rendering may performed, such as by rendering and compositing a first set of plug-in layers in a first rendering stage, saving the first composited layers in an off-screen buffer, and then, in a second rendering stage, rendering a second set of plug-in layers to be composited with the first composited layers.

As mentioned above, each plug-in 114 may be configured to perform a different function, such as for rendering content of the content item and/or for providing content-enhancing features that may include panorama views, slideshows, scrollable frames, image sequences, buttons, webviews, hyperlinks, animation panels, zoomable panels, automatic reorientation of two-page spreads, read alongs, textbook write-ins, quizzes, video and/or audio. In some examples, the plug-ins 114 may utilize the rendering and compositing API(s) 124 (not shown in FIG. 2) for rendering the content to the plug-in layers 212. This can enable the plug-ins 114 to render to their respective plug-in layers independently and in parallel one another.

As described above with respect to FIG. 1, the cross-platform module 112 may perform plug-in compositing 120, such as by employing the rendering and compositing API(s) 124 to generate the composited content layer 122 in the platform view layer 206, and which is exposed by the platform view to the presentation application in response to receiving the event. Thus, the rendering by the plug-ins to respective plug-in layers 212 enables different plug-ins to render to the display in a specific desired Z-order (i.e., the order in which rendered layers overlay one another in the Z-axis direction on a display). In some instances, the cross-platform module 112 may composite the plug-in layers 212 corresponding to each of the active plug-ins into a single composited content layer 122 that is presented on the display via the platform view. Subsequently, the OS may perform platform compositing 134 to a display layer 222 to generate the assembled composited image 136. For instance, the OS may composite the OS layer 204, the platform view layer 206, and the presentation application layer 208 into the assembled composited image 136. Accordingly, as one example, the OS may composite the composited content layer 122 with at least one of an image rendered by the OS or an image rendered by the presentation application 110, such as an image of one or more UI components.

In the example of FIG. 2, the Z-order of the content portions rendered by plug-ins corresponds to the order in which the plug-in layers 214, 216, 218 and 220 are ordered in the stack of plug-in layers 212. Thus, in the assembled composited image 136, an image portion 224 corresponding to the plug-in layer 220 overlies an image portion 226 corresponding to the plug-in layer 216 based on the plug-in layer 220 overlying the plug-in layer 216 in the stack of plug-in layers 212. Of course, FIG. 2 illustrates just one possible example for discussion purposes. Numerous other possible implementations will be apparent to those of skill in the art having the benefit of the disclosure herein.

Figure 3:
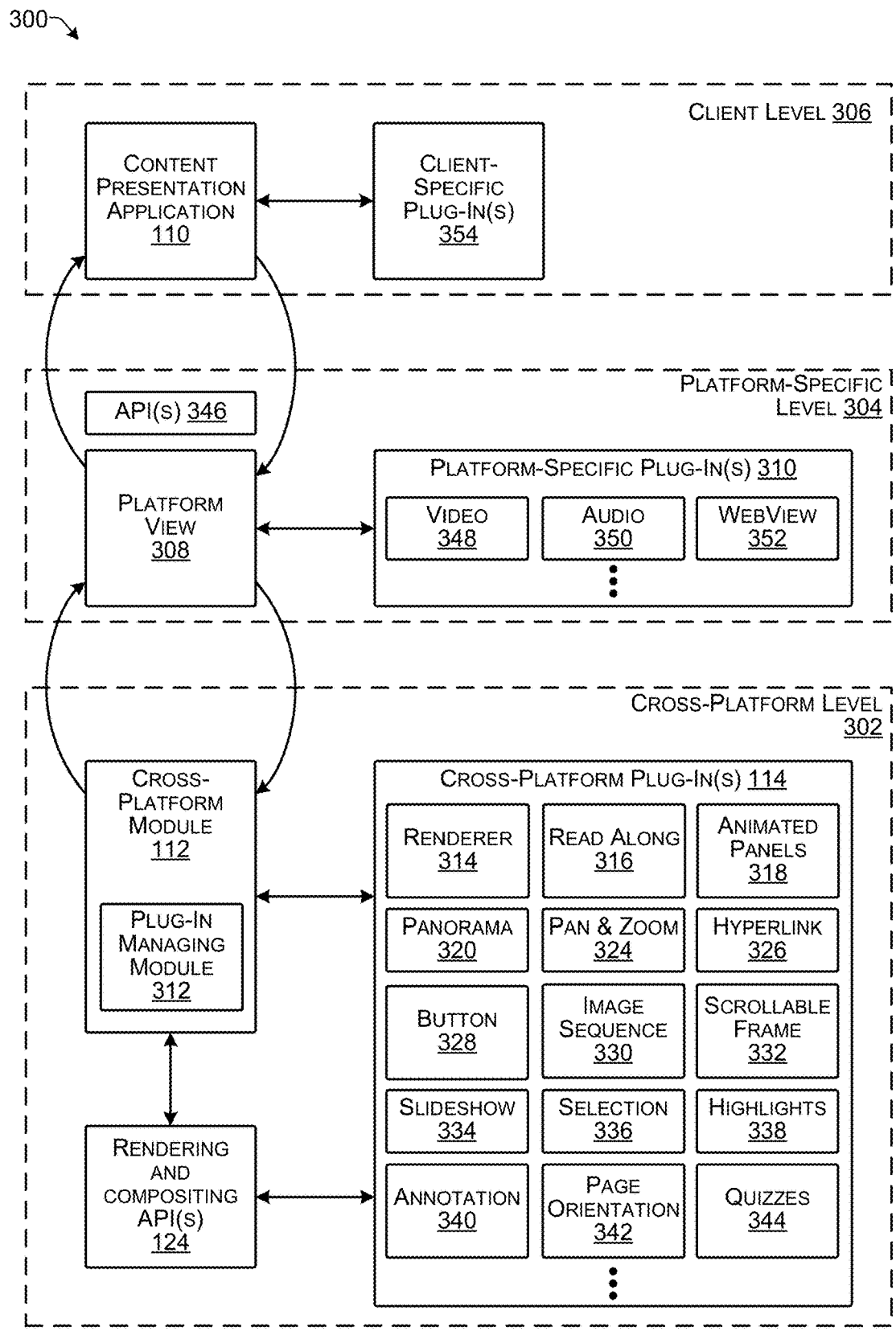
FIG. 3 illustrates an example architecture for content rendering and compositing using plug-ins according to some implementations.

FIG. 3 illustrates an example architecture 300 for content rendering and compositing according to some implementations. The architecture 300 includes a cross-platform level 302, a platform-specific level 304, and a client level 306. The cross-platform module 112 may reside in the cross-platform level 302. As mentioned above, the cross-platform module 112 may include a modular plug-in-based framework that employs a plurality of different task-specific cross-platform plug-ins 114 for respective different rendering tasks. This modular framework can allow different plug-ins 114 to render to the display in a specific desired Z-order.

In some instances, the cross-platform module 112 may composite layers corresponding to each of the active plug-ins 114 into a single composited content layer or image. The composited content layer may then be presented on the display via a platform view 308 that resides at the platform-specific level 304. Accordingly, the cross-platform module 112 may implement the plug-ins 114 that are cross-platform compatible. However, some types of plug-ins, such as those providing video and audio rendering services, may use platform-specific APIs or other platform-specific features, such as for conforming to and/or employing specific features provided by a particular OS. Thus, in some examples, platform-specific plug-ins 310 may be provided through the platform view 308 at the platform-specific level 304.

Typically, the platform-specific plug-ins 310 may be registered with the plug-in manager module 312 at the time of initialization of these plug-ins 310. Accordingly, the platform-specific plug-ins 310 may be instantiated by the plug-in manager module 312 in response to an incoming event in a manner similar to the instantiation of the cross-platform plug-ins 114 discussed above. In some examples, however, the platform-specific plug-ins 310 may be rendered and composed by the OS, rather than the cross-platform module 112.

The cross-platform module 112 may also include the ability to override one or more plug-ins 114. For instance, this may be useful on platforms in which a different behavior is desired than that performed by the plug-in being overridden. In such an event, the default plug-in 114 may be over-ridden by another plug-in 114 or 310 that behaves as desired for the particular platform. For instance, when a platform-specific plug-in 310 and a cross-platform plug-in 114 are both available for performing a desired function, the platform-specific plug-in 310 may be used to override the similar cross-platform plug-in 114 to presumably provide superior results on the particular platform. For example, an OS may include its own video player, and thus, a platform-specific video plug-in may use the video player of the OS, which can avoid providing an independent video player as a cross-platform plug-in 114. As one example, to override a first plug-in with a second plug-in, the second plug-in may simply register with the plug-in managing module 312 using the same name as the first plug-in which it will override. For example, if there is a plug-in called "video" that that was implemented in a default manner, another plug-in may register as "video" and override the rendering and interaction for this feature. Accordingly, cross-platform plug-ins 114 of a first type and platform-specific plug-ins of a second type may be used to output content concurrently. For example a cross-platform plug-in supported by a plurality of different OS platforms may output a first portion of content, and a platform-specific plug-in support by a particular OS platform may output a second portion of the content.

The plug-ins 114 employed by the cross-platform module 112 may be self-contained modules that adhere to a framework interface that includes a plug-in managing module 312. For example, an event may be received by the plug-in managing module 312 and routed to one or more of the plug-ins 114, as appropriate depending on the nature of the received event. For instance, based on the event, the plug-in managing module 312 may route the event to a subset of the cross-platform plug-ins 114, which may respond to the particular event, such as by getting and rendering content corresponding to the particular event. In the illustrated example, the cross-platform plug-ins 114 include a renderer plug-in 314, which may be used for rendering the main or primary content of a content item. For instance, in the case that the content item is an electronic book, the renderer plug-in 314 may render the main text of the electronic book, or a portion thereof. Further, in some examples, the renderer plug-in 314 may also render images included in the electronic book content if those images are not intended for special treatment by one of the other plug-ins 114.

Additional examples of cross-platform plug-ins 114 may include a read along plug-in 316, which may provide text-to-voice synthesization for outputting an audio version of the text; an animated panels plug-in 318, which may display a panel within the content that includes an animated image; a panorama plug-in 320, which may display a panorama view of an image; a pan & zoom plug-in 324, may enable panning and/or zooming of a portion of content; a hyperlink plug-in 326, which may enable the use of hyperlinks with a portion of content; a button plug-in 328, which may enable display of one or more buttons or icons for interacting with the content or other content enhancing features; an image sequence plug-in 330, which may display a sequence of images with the content; a scrollable frame plug-in 332, which may display scrollable frames with the content; a slideshow plug-in 334, which may display a slideshow with the content; a selection plug-in 336, which may display a selected portion of content selected by a user; a highlights plug-in 338, which may display highlighting made by a user or by other users; an annotation plug-in that may display annotations made by a user or by other users; a page orientation plug-in that may change an orientation of a display from two pages to one, or vice-versa, upon rotation of the electronic device; and a quizzes plug-in that may enable quizzes to the be presented with the content. Further, while several example plug-ins have been shown and described, numerous other types of plug-ins for presenting other types of content portions or performing various other tasks, such as with respect to the content and/or other plug-ins, will be apparent to those of skill in the art having the benefit of this disclosure.

Based on incoming event(s) received by the plug-in managing module 312, one or more of the plug-ins 114 may be loaded to render appropriate content to their own respective plug-in layers, as discussed above with respect to FIG. 2. Examples of such content may include content pages rendered by the renderer plug-in 314, panoramic images rendered by the panorama plug-in 320, and virtual buttons rendered by the button plug-in 328. The cross-platform module 112 and/or the active plug-ins 314, 320 and 328 may employ the compositing and rendering API(s) 124 for hardware accelerated rendering and compositing of the output of the active plug-ins 314, 320 and 328. Using the rendering and compositing API(s) 124, which are cross-platform compatible, allows the cross-platform module 112 and plug-ins 114 to achieve cross-platform compatibility as well.

As mentioned above, the platform view 308 may be provided between the presentation application 110 and the cross-platform module 112. In some examples, the platform view 308 may be a thin, platform-specific layer of software that is configured to translate platform-specific events to events that are recognized by the cross-platform module 112. Furthermore, the platform view 308 may expose a platform-specific API 346 of the cross-platform module 112 to the presentation application 110 of a particular platform. This can enable the presentation application 110 to communicate with the cross-platform module 112.

Accordingly, there may be a separate implementation of the platform view 308 for each different platform in an ecosystem including a plurality of different OS platforms. The platform view 308 for each platform may expose the functionality of the cross-platform module 112 to the presentation application 110 that runs on the corresponding platform. Consequently, the presentation application 110 is able to reside in the client level 306, above the platform view 308, without having to manage the events and rendering complexities in the content. In some instances, the platform view 308 may drive the rendering for the cross-platform module 112, and may also convert detected events from platform-specific gestures to cross-platform events that can be consumed by the cross-platform module 112.

As mentioned above, the plug-ins 114 may be cross-platform compatible. However, other plug-ins 310 may be configured as platform-specific plug-ins, such as to enable them to interact with APIs or other features provided by the particular OS platform for which they are intended. Several examples of platform-specific plug-ins may include a video plug-in 348, an audio plug-in 350, and/or a webview plug-in 352. For instance, these plug-ins 310 may be configured to operate with the APIs or other features of particular OS platforms. Furthermore, some examples may include client-specific plug-ins 354, such as for providing particular enhanced features to particular client devices. The client-specific plug-ins 354 may be implemented through the presentation application 110. Further, in some examples, there may be different classes of the plug-ins 114. For example, different devices may have different rendering capabilities, such as by having a GPU or not. Accordingly, different levels or classes of plug-ins 114 may be provided depending on the capabilities of particular types of devices. For instance, a plug-in of a first class may be configured to provide output by rendering using a GPU, while a second class of the plug-in may be configured to provide the output using a CPU for rendering.

Some examples include monitoring events experienced by an electronic device and/or by a content item presented by the electronic device. In some instances, these events are indicative of interactions between a user of the electronic device and a content item that the user consumes on the electronic device. In other instances, the events may be indicative of events experienced by the device itself or events generated by the content. In response to detecting an interaction between the user and the content item, an event indicative of the interaction to may be published or delivered to the cross-platform module 112, and thereby to the plug-in managing module 312 for the plurality of cross-platform plug-ins 114.

An event received by the plug-in managing module 312 may correspond to a current interaction between the user and the content item. For instance, the event may indicate that the user has turned a particular page, has highlighted certain text, has selected a particular icon, has adjusted a setting on the electronic device (e.g., volume, brightness, etc.), has provided an input to the electronic device, or that the user has interacted with the content item in some other way. In response to receiving the event and identifying the interaction, the plug-in managing module 312 and/or each of the plug-ins 114 may compare the event to a respective set or other type of list of predefined events to which the plug-ins 114 are configured to respond. For instance, if a particular plug-in 114 is configured to render a particular portion of content in response to a user reaching a certain page of a certain electronic book, then the plug-in 114 may compare a published event to the set of predefined events to determine whether this particular interaction has occurred. In response to determining that the event has occurred, the plug-in may render or otherwise output the particular portion of predefined content to the plug-in rendering layer. The rendered plug-in content may be composited with any other plug-in content into a composited content layer. Subsequently, the composited content layer may be further composited with the OS content and/or the presentation application content for presentation on the display as an assembled composited image. Additionally, or alternatively, the plug-in manager may maintain a list of events to which each plug-in is configured to respond, and may direct the events to the appropriate plug-in based on the list maintained by the plug-in manager.

In addition, in some cases, the plug-in-generated content may be used to cause changes in other plug-in content and or the main content of the content item. As one example, suppose that a plug-in generates a game to a portion of a page of an electronic book. The user may play the game, and depending on the user's score or other outcome of the game, the content of the electronic book may be changed by the plug-in. For instance, the plot or characters of the book may be changed based on the outcome of the game played within the content of the book itself.

Figure 4:
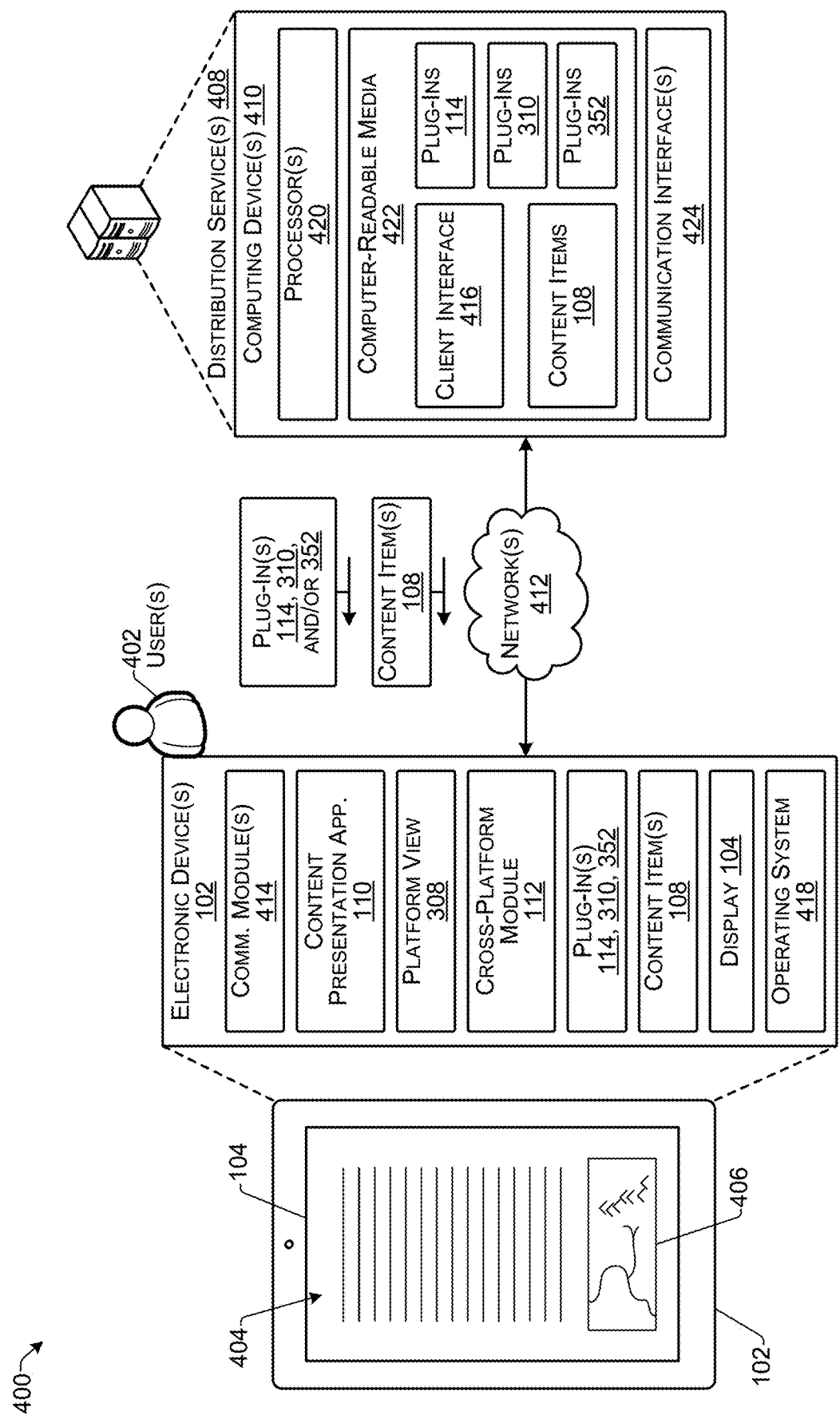
FIG. 4 illustrates an example system for content rendering and compositing using plug-ins according to some implementations.

FIG. 4 illustrates an example system 400 in which one or more users 402 employ one or more respective electronic devices 102 to consume varying types of content items 108. FIG. 4 illustrates an example electronic device 102 that renders a content item 108, which in this example is an electronic book 404, on the display 104, as well as an additional content portion 406 that supplements the main portion of the electronic book 404 that is currently being presented. In this example, the "additional" content portion 406 comprises a map showing locations that are discussed within the electronic book 404. As one example, the map 406 may be presented as a image that can be panned, zoomed or rotated in response to user interaction. In other instances, the additional content portion 406 may comprise any content that supplements or enhances the electronic book 404, visually, audibly, tactilely, or otherwise.

In the example of FIG. 4, the user 402 employing the electronic device 102 may download or otherwise access the content item 108 comprising the electronic book 404 from a distribution service 408 having one or more computing devices 410 that are accessible over one or more network(s) 412. As one example, the distribution service 408 may be any of one or more distribution services that provide content items 108 and/or plug-ins 114, 310, and/or 352 to electronic devices 102.

The one or more networks 412 may include a local area network (LAN), a wide area network (WAN), such as the Internet, or any combination thereof, and may include both wired and/or wireless communication technologies, including cellular communication technologies as well as wired or fiber optic technologies. The one or more computing devices 410 and the electronic devices 102 may communicate and interact with one another using any combination of suitable communication and networking protocols, such as Internet protocol (IP), transmission control protocol (TCP), hypertext transfer protocol (HTTP), cellular communication protocols, and so forth.

In FIG. 4, the distribution service 408 is illustrated as a network-based or cloud-based service, available over a public network such as the Internet. The electronic device(s) 102 may be configured to allow the user(s) 402 to conveniently browse for content items 108 available from the distribution service 408, and to obtain (e.g., purchase) and download selected content items from the distribution service 408.

Various applications and user interfaces may be used in conjunction with the electronic devices 102 to interact with the distribution service 408. For example, the electronic device 102 may include one or more communication modules 414, such as an Internet browser program that allows a user to interactively engage different online services. Additionally, or alternatively, the distribution service 408 may expose lower-level interfaces or APIs through the network 412, through which the electronic devices 102 and the one or more communication modules 414 can access the underlying functionality of the distribution service 408 without direct user interaction. As another example, a user may interactively purchase an eBook or other content item 108 using a personal computer or some device other than the example electronic device 102.

The distribution service(s) 408 may be implemented in some examples by an online merchant or vendor. Electronic books and other content items 108 might be offered for sale by such an online merchant, or might be available to members or subscribers for some type of periodic or one-time fee. In some circumstances, content items 108 might be made available without charge. In either instance, the distribution service 408 may include a client interface 416 through which electronic devices 102 interact with the distribution service 408. The client interface 416 may include a virtual storefront or other type of online interface for interaction with consumers and/or devices. The client interface 416 may expose a graphical, web-based user interface that can be accessed by human users to browse and obtain (e.g., purchase, rent, lease, etc.) content items 108. The client interface 416 may also expose programmatic interfaces or APIs that entities and devices can use to obtain digital content items 108 and related services.

In the illustrated example, the electronic device 102 may include nonvolatile storage capabilities so that content items 108 can be downloaded and stored in their entirety on the electronic device 102. For instance, the electronic device 102 may store the illustrated electronic book 404 as one of content items 108 stored on the electronic device 102. In some instances, once a content item 108 has been stored by an electronic device 102, the content item 108 can be displayed and consumed at any time, whether or not the electronic device 102 is connected to a network. In other examples, the electronic device 102 may stream or otherwise receive content items 108 on-demand.

In the illustrated example, the electronic device 102 stores or otherwise has access to the content presentation module 110, the platform view 308, the cross-platform module 112, the plug-ins 114, 310 and/or 352 described above with reference to FIGS. 1-3, as well as the content item 108 (i.e., the electronic book 104). The device 102 also includes an OS 418, and may also include numerous other devices and modules found in traditional electronic devices, such as various sensors (e.g., location sensors, position sensors, etc.), and the like. Examples of the OS 418 are enumerated above.

At a high level, the cross-platform module 112 may receive events experienced by the electronic device 102 and/or provided by content items being output on the electronic device 102. For instance, the cross-platform module 112 may receive events corresponding to interactions between a user 402 of the electronic device 102 and the electronic book 404. These interactions may include the user turning a page of the book, reaching a page in the book that includes a hidden tag or other marker, highlighting or otherwise selecting text in the book, changing a font size of the book, annotating or otherwise commenting on the book, adjusting a setting (e.g., contrast, volume, etc.) of the device itself, or any other interaction. These interactions may also include interactions with additional content portions rendered by the plug-ins, such as swiping, tapping or rotating a presented 2D or 3D image, scrolling, zooming, or panning an image, etc. In response to receiving an event corresponding to an interaction, the plug-in managing module 312 (not shown in FIG. 4) of the cross-platform module 112 directs the corresponding event to one or more of the plug-ins 114. Additionally or alternatively, the cross-platform module 112, or another module on the electronic device 102, such as a plug-in 114, 310 or 352, may identify events experienced by the electronic device 102 (e.g., a scheduled event occurring, a rotation of the device, etc.) and may direct these events to one or more plug-ins 114.

In some instances, the plug-in managing module 312 may direct each event to the plurality of plug-ins 114, while in other instances the plug-in managing module 312 may direct each event to a selected subset of the plug-ins 114 based on knowledge of the event and the types of events handled by the respective plug-ins 114. The plug-ins 114 comprise modules that are configured to render content, which may extend, enhance, or otherwise supplement the primary content of one or more content items 108. In some instances, a plug-in 114 may be associated with a particular content item 108 or set of content items 108 (e.g., a particular electronic book or set of books), while in other instances the plug-ins 114 are associated with a larger set or all content items 108 able to be presented on the electronic device 102.

In some instances, the electronic device 102 may obtain or receive one or more of the plug-ins 114 from the distribution service 408. For instance, the user may have downloaded a content item 108 that can employ a particular plug-in that may not already be installed on the electronic device 102. Accordingly, a particular plug-in 114, 310 or 352, such as for enhancing the content, may be downloaded concurrently with a particular content item 108, or may be downloaded before or after the particular content item 108. Thus, the plug-ins 114, 310 or 352 may be files that are separate from the corresponding content item(s) 108 for which they provide additional content. As another example, when the presentation application 110 loads a content item 108 for presentation, the content item 108 may include metadata listing the plug-ins that will be used by the content item. The cross-platform module 112 may check the device 102 for plug-ins currently loaded on the device, and may download any missing individual plug-ins not already present on the device.

Additionally, in some examples, one or more of the plug-ins 114, 310 or 352 may be revised, replaced, or otherwise updated. Accordingly, an updated plug-in 114, 310 or 352, or an updated portion of a plug-in, may be downloaded by the electronic device 102, such as in response to a notification that the update is available. In other examples, the update may be pushed to the electronic device 102, such as with an update to the cross-platform module 112 and/or the content presentation application 110. Upon receipt, the updated plug-in or the new plug-in may be registered with the plug-in manager module 312, or may be otherwise identified to the plug-in manager module 312 as being a plug-in available to receive events and render content on the electronic device 102.

In some examples, the plug-ins 114 may receive events from the cross-platform module 112 and may determine whether to respond to the event, such as by rendering content. In this case, the plug-ins 114 that receive the events may determine whether or not to provide additional content for output on the electronic device 102, and/or whether to provide additional information to another one of the plug-ins 114. As one example, each plug-in 114 may be configured to respond to a set of predefined events and, therefore, the plug-in 114 may compare each event to this set. In response to locating a match, the plug-in 114 may render content for output and/or may provide information to another plug-in.

In some instances, the cross-platform module 112 may select a subset of one or more of the plug-ins 114 to which to route an event. The selected subset may be based on a variety of criteria, such as: a type or classification of the interaction (e.g., opening a new book, a page turn, etc.); an identity or classification of the content item; preferences of a user consuming the content item or preferences of similar users; past interactions between the user and content items or past interactions of similar users and content items; capabilities of the electronic device 102; whether or not the electronic device 102 is connected to a network; a current location of the electronic device 102; information associated with selected text; a location in the content item at which the interaction occurs; a current date or time; an affinity between the content item and each of the plug-ins; and/or any other information associated with the content item, the plug-ins, the interaction, or the user.

In some instances, the additional content portion provided by a plug-in 114 may overlay onto a content item, may appear in a whitespace of the content item, or may require selection of an icon by a user to view the additional content portion. In the latter instances, the icon may comprise an underline of a particular piece of text, an "info" icon above the appropriate text, or the like. In response to a user activating the icon, this results in a subsequent event to cause one or more plug-ins 114 to output the content (e.g., the map 406 illustrated in FIG. 4, etc.).

The one or more computing devices 410 of the distribution service(s) 408 may include one or more servers or other types of computing devices that may be embodied in any number of ways. For instance, in the case of a server, the functional components and data may be implemented on a single server, a cluster of servers, a server farm or data center, a cloud-hosted computing service, a cloud-hosted storage service, and so forth, although other computer architectures (e.g., a mainframe architecture) may also be used. Further, while the figures illustrate the components and data of the one or more computing devices 410 as being present in a single location, it is to be appreciated that these components may be distributed across different computing devices and different locations in any manner. The described functionality may be provided by the servers of a single entity or enterprise, or may be provided by the servers and/or services of multiple different entities or enterprises.

In the illustrated example, the one or more computing devices 104 include one or more processors 420, one or more computer-readable media 422, and one or more communication interfaces 424. Each processor 420 may be a single processing unit or a number of processing units, and may include single or multiple computing units or multiple processing cores. The processor(s) 420 can be implemented as one or more microprocessors, microcomputers, microcontrollers, digital signal processors, central processing units, state machines, logic circuitries, and/or any devices that manipulate signals based on operational instructions. For instance, the processor(s) 420 may be one or more hardware processors and/or logic circuits of any suitable type specifically programmed or configured to execute the algorithms and processes described herein. The processor(s) 420 can be configured to fetch and execute computer-readable instructions stored in the computer-readable media 422.

The computer-readable media 422 may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device(s) 104, the computer-readable media 422 may be a type of computer-readable storage media and/or may be a tangible non-transitory media.

The communication interface(s) 424 may include one or more interfaces and hardware components for enabling communication with various other devices over the network(s) 412, such as the electronic devices 102. For example, communication interface(s) 424 may enable communication through one or more of the Internet, cable networks, cellular networks, wireless networks (e.g., Wi-Fi) and wired networks.

The computer-readable media 422 may store any number of functional components that are executable by the processors 420. In many implementations, these functional components comprise instructions or programs that are executable by the processors 420 and that, when executed, specifically configure the one or more processors 420 to perform the actions attributed above to the one or more computing devices 410. Functional components stored in the computer-readable media 422 may include the client interface 416 for delivering content items 108 and/or plug-ins 114, 310, 352 to the electronic devices 102. Additional functional components (not shown) may include an OS for controlling and managing various functions of the one or more computing devices 410 and modules for implementing a website. In addition, the computer-readable media 422 may store the content items 108 and the plug-ins 114, 310 and 352. The one or more computing devices 410 may also include many other logical, programmatic and physical components, of which those described above are merely examples that are related to the discussion herein.

Figure 5:
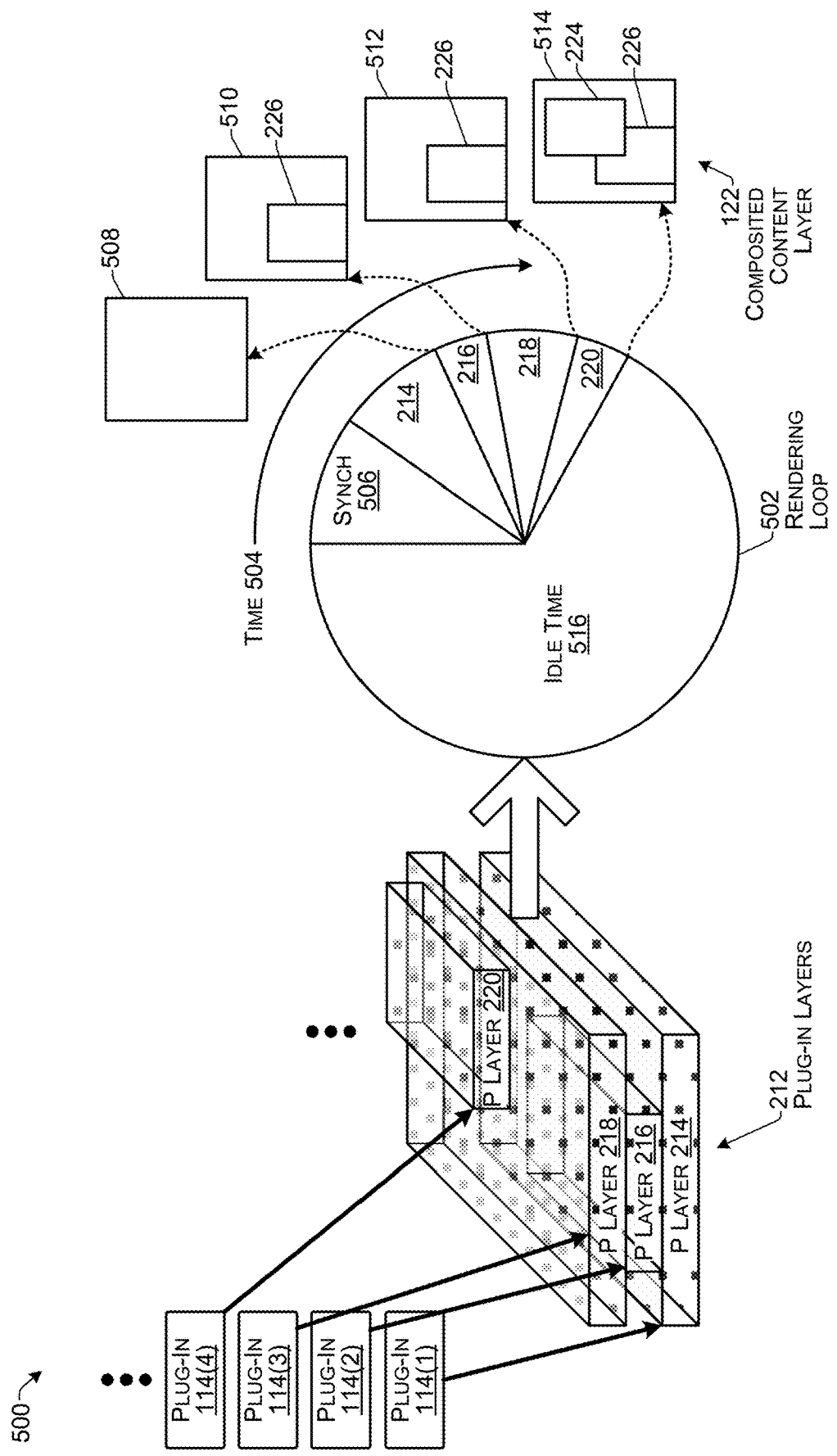
FIG. 5. illustrates an example framework for a rendering loop according to some implementations.

FIG. 5 illustrates an example rendering loop framework 500 according to some implementations. In some instances, the cross-platform module 112 coordinates and composites the rendering performed by the plug-ins. Referring back to the example of FIG. 2, the stack of plug-in layers 212 include the plug-in layers 214-220, each of which may be rendered by a different plug-in 114. Accordingly, the plug-in layers rendered for the platform view are cross-platform compatible and may be rendered in a rendering loop that may be based on a desired frame rate. Thus, each of the plug-ins 214-220 may have its content re-rendered at a fixed rate based on the frame rate. The cross-platform module 112 may call or instruct each of the active plug-ins 214-220 to perform rendering at a predefined frame rate, such as 30 frames per second, or any other desired frame rate.

As one example, the cross-platform module 112 may execute a rendering loop 502 for each frame that is output to the display or other output device. Conceptually, each layer may be rendered from a lowest Z-order to a highest Z-order. The respective plug-ins may be configured to perform only rendering calls when executed as part of the rendering loop 502 on a rendering thread. For example, no blocking calls or processor intensive calculations may typically be performed at this point, since many plug-ins may be executed in a short window of time corresponding to the rendering loop 502. For instance, if a particular plug-in needs to perform time-consuming calculations, perform input/output steps, etc., to render its content, the particular plug-in may be assigned its own rendering thread that is separate from the rendering thread corresponding to the rendering loop 502. The result of one cycle of the rendering loop 502 is composited by the cross-platform module 112 and output for further compositing by the OS with the output of the content presentation application 110, as well as with any OS content. The rendering loop 502 then continues to the next frame in the frame sequence.

In some cases, two or more plug-ins may interact with each other in synchronization as part of an animation, or the like. For instance, if a list presented on the display by a first plug-in is expanded vertically, other elements presented with this list by a second plug-in may be moved as the list is animated. Since the two plug-ins may be processing events asynchronously, there could be a potential race condition in which the rendering and the updating of the positions of the plug-ins are not aligned. This could cause the elements rendered by one or more of the plug-ins to appear to be separated from the animation in some frames, which may result in an inferior user experience. Consequently, to avoid this issue, the plug-ins herein may each include a synchronization method or routine. The synchronization method may be called before the start of each rendering loop 502 to enable tightly coupled interactions to occur. For instance, if a plug-in tries to update the position of another plug-in in real time, the plug-in may use the synchronization method call for updating the position of the other plug-in. Any processing during this call may desirably be quick and nonblocking, similar to the constraints of the render call overall.

In the example of FIG. 5, each plug-in layer 214-220 is rendered by its respective plug-in 114(1)-114(4) as part of the rendering loop 502. Time 504 is represented by an arrow traversing in the clockwise direction. Initially, any synchronization is performed at 506, such as by calling the synchronizing method for all active plug-ins 114(1)-114(4). Accordingly, if one of the plug-ins will interact with another plug-in, such as by updating a position of the other plug-in, or the like, the update may be performed during this step. Next, the plug-ins may perform rendering according to the proper Z-order during the render loop. For example, each plug-in may register itself with the cross-platform module 112, which allows the cross-platform module 112 to call each plug-in in the proper Z-order during the rendering loop 502. In some examples, the plug-ins herein may use a backend 2-D graphics engine during rendering or, alternatively, may access the rendering and compositing API(s) 124 directly when performing rendering. In the case that a plug-in uses the 2-D graphics engine for rendering, the cross-platform module 112 may use the rendering and compositing API(s) 124 to take the result produced by the 2-D graphics engine and composite the result with the layers rendered by the other plug-ins.

In the illustrated example, to execute the rendering loop 502, following any synchronization 506, the cross-platform module 112 calls plug-in 114(1) to render the plug-in layer 214 to produce a first layer image 508, which may be stored in an off-screen buffer or other suitable location in memory. Next, the cross-platform module 112 calls plug-in 114(2) to render the plug-in layer 216, and may composite the plug-in layer 216 with the plug-in layer 214 to produce a second layer image 510 that includes the image portion 226. Alternatively, as another example, the compositing may be performed after some or all of the image layers 214-220 have been rendered and stored in separate buffers. Next, the cross-platform module 112 calls plug-in 114(3) to render the plug-in layer 218, which may be composited with the image 510 to produce a third layer image 512. Next, the cross-platform module 112 calls plug-in 114(4) to render the plug-in layer 220, which may be composited with the image 512 to produce a fourth layer image 514 that includes the image portion 224. Thus, with the rendering steps complete, the remainder of the rendering loop may comprise idle time 516, and the fourth layer image 514 may be provided by the platform view 206 as the composited content layer 122 to the operating system for further compositing with any images from the OS level, the presentation application level, or the user level of the OS, as discussed above with respect to FIG. 2.

Furthermore, for platform-specific plug-ins 310 discussed above with respect to FIG. 3, these can be added into the rendering hierarchy of the platform at the platform view level. For example, suppose that a cross-platform plug-in 114 may not be able to render web-based content for a particular OS. In this case, a platform-specific plug-in may be used to render the web-based content with the other content of a content item. Accordingly, when web-based content needs to be rendered, the platform view may call the platform-specific plug-in to render this content. The rendered web-based content may be composited by the OS with the other rendered content during the platform compositing stage.

Figure 6A:
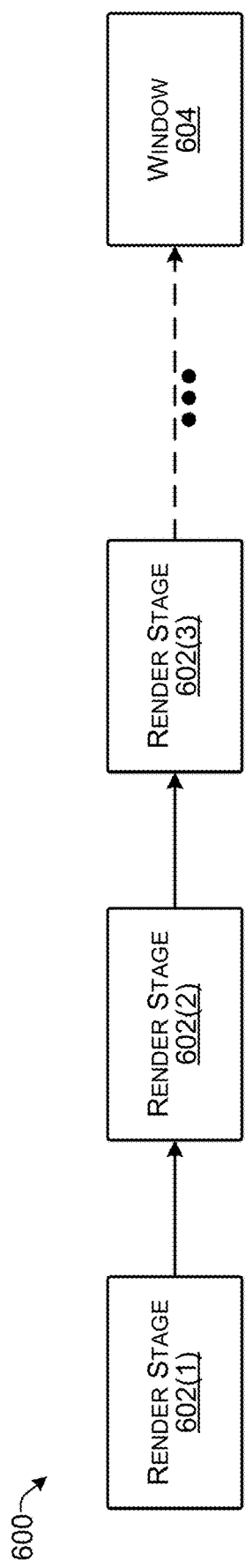
FIGS. 6A and 6B illustrate example rendering pipelines according to some implementations.
Figure 6B:
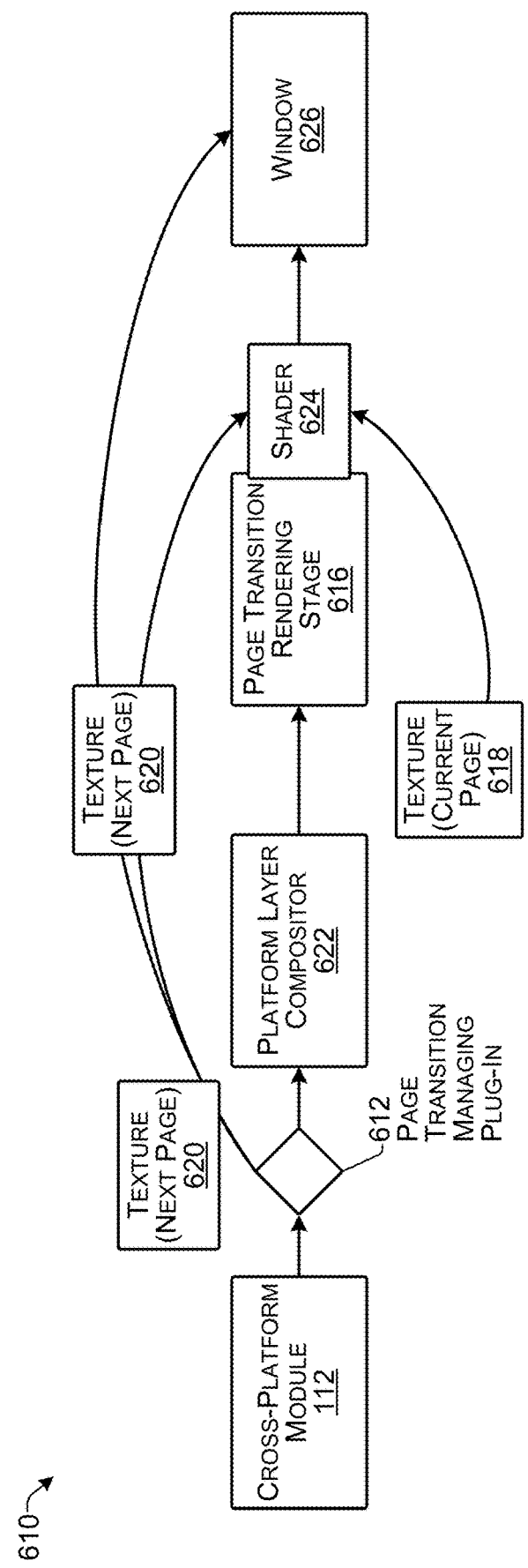

FIGS. 6A and 6B illustrate example rendering pipelines according to some implementations. In the example of FIG. 6A, an example rendering pipeline 600 includes one or more render stages 602 such as render stage 602(1), 602(2) and 602(3) to provide a window 604. In a simple case, the rendering pipeline 600 may only include one stage in which the active plug-ins are composited for output in a single pass. However, other effects may require multiple passes on the data being rendered e.g., for applying aftereffects to the rendered content, such as page transitions or the like. Accordingly, multistage rendering as illustrated in FIG. 6A may be employed to provide these effects. For instance, the cross-platform module 112 may oversee the render stages 602, and may provide the input and manage the output for each stage 602(1)-602(3).

As one example, to support page transitions, the cross-platform module 112 may allow plug-ins to create and delete off-screen buffers, redirect plug-in rendering calls to an off-screen buffer, and provide the output of a rendering pass across multiple rendering passes. For instance, for creating and deleting off-screen buffers, the cross-platform module 112 may implement frame buffer objects and a texture. This configuration may include an API for access by the plug-ins that enables parameters of the desired buffer to be provided by the plug-in. The cross-platform module 112 may then create a texture that can be used as storage for the created off-screen buffer. Optionally, a plug-in may request that the cross-platform module 112 leave the buffer object active or to keep a previous buffer object active. For example, the off-screen buffer may receive redirected rendering calls. Furthermore, a stack like implementation of off-screen buffers may be created when cascading multiple off-screen buffers inside the same rendering loop. The plug-ins can use the texture name inside an arbitrary shader for sampling purposes. This can help plug-ins used to implement multistage rendering to know their position in the rendering chain.

In some examples, the cross-platform module 112 may push a set of plug-ins to named buckets. The cross-platform module 112 may maintain a list of buckets and may only redraw buckets that are marked as dirty, i.e., having received at least one event. Each bucket may have its own off-screen buffer, although the last bucket in a bucket chain may render against a default frame buffer object for providing the results to the display. As one example, a bucket chain may be used for generating page transitions.

FIG. 6B illustrates an example pipeline 610 for generating a page transition effect according to some implementations. Page transitions can be created by adding a second stage in the rendering pipeline that will apply a pan or a curl to the currently viewed page while the next page is rendering or loading. For example, a page transition managing plug-in 612 may be included as one of the cross-platform plug-ins 114 that exist below the content renderer. The page transition managing plug-in 612 may handle received gestures indicative of turning the page, and may control how the page transition pipeline 610 functions for providing a page transition effect.

As one example, the page transition managing plug-in 612 may receive from the cross platform module 112, a gesture from the user as an event that matches a predefined event of the page transition managing plug-in 612. For instance, the page transition managing plug-in 612 may inform the cross platform module 112 that the page transition managing plug-in 612 should be placed on top of all other plug-ins to ensure that it captures page-turn-related gestures. In response to receiving a page-turn event, the page transition managing plug-in 612 may start the page transition effect. For example, the page transition managing plug-in 612 may notify a page transition rendering stage 616 to swap textures and show a texture 618 for the current page on top while leaving a texture 620 for the main content of the next page out of view. The page transition plug-in may further signal the page transition rendering stage 616 and/or a platform layer compositor 622 of the OS, to render the next page behind the current page. Accordingly, when the page transition animation is complete the page transition managing plug-in 612 may notify the page transition rendering stage 616 to show the contents (i.e., the next page) of the off-screen buffer (shader 624) to which the rendering plug-in is actively rendering in a window 626 on the display level. In some examples, the next page may be cached by the content renderer to ensure that a blank page is not displayed in the window 626. Other plug-ins may then subsequently render interactive components for the next page after the main content of the next page has been rendered.

Figure 7:
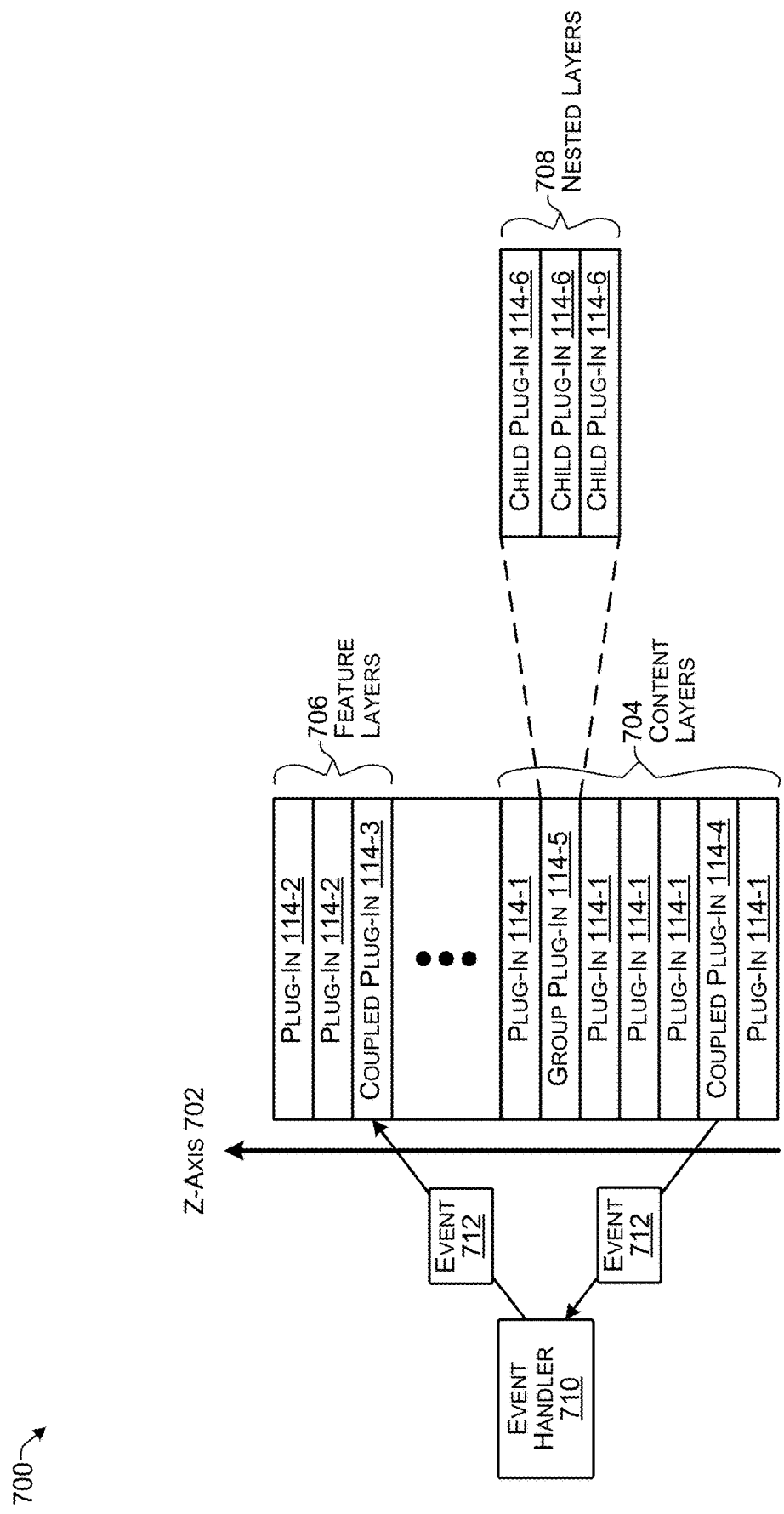
FIG. 7 illustrates an example compositing stack according to some implementations.

FIG. 7 illustrates an example rendering and compositing stack 700 according to some implementations. In some instances, the cross-platform plug-ins 114 may be configured to allow flexible modular design for all components for use in the rendering of all types of content. Each plug-in 114 may be a self-contained, fully vetted module that can provide a layer in the rendering hierarchy. In some examples, content level plug-ins may exist primarily on the bottom portion of the rendering and compositing stack 700, and feature level plug-ins may exist primarily near or at the top of the rendering and compositing stack 700, relative to the Z-axis direction 702. For instance, content level plug-ins 114-1 may be those plug-ins, such as the main content rendering plug-in and other content rendering plug-ins, that receive specific details about the content itself for rendering content layers 704. Feature level plug-ins 114-2 may be those plug-ins that can be used generically for rendering feature layers 706 on top of any content, such as for providing highlighting, a thumbnail scrubber, or the like.

In a simple use case, plug-ins 114 may operate independently of one another, and may each provide their own rendering layer (i.e., a separately rendered image) to the compositing stack. However, in other cases, the plug-ins 114 may interact with one another. Examples of plug-ins that interact with one another may include coupled plug-ins and nested plug-ins.

As one example, the plug-ins 114 may include coupled plug-ins 114-3 and 114-4 in which a first plug-in 114-3 is coupled to a second plug-in 114-4, and at least one of the coupled plug-ins can influence the behavior of the other. Coupled plug-ins 114-3 and 114-4 may occur when a state change in a first one of the coupled plug-ins can affect the state of the other plug-in. An example of this includes a slideshow plug-in that changes the state of a button provided by a button plug-in when a particular slide is reached. For example, suppose that during the slideshow the button is displayed as a "stop" button that may be selected to stop advancement to the next slide. However, when the last slide of the slideshow is reached, the button may be changed to be displayed as a "replay" button, or the like, such as for replaying the slideshow. To accomplish this, an event handler 710 may be provided by the cross platform module 112. For instance, the event handler 710 may be part of the plug-in managing module 312, or may be a separate module. Plug-ins can register and/or be registered with the event handler 710 and may receive events from other plug-ins via the event handler 710. Accordingly, in the slideshow example above, when the slideshow reaches the last slide in the slideshow, the slideshow plug-in may send an event 712 to the event handler 710. The event handler 710 may issue the event 712 to one or more plug-ins registered with the event handler 710, such as the button plug-in, which may compare the event 712 with its own list of predefined events and, in response, may change the button currently displayed with the slideshow to the different button discussed above.

Further, in some cases, multiple plug-ins 114 may exist on the same level. If these plug-ins on the same level render images that overlap, the priority for which plug-in image should be presented on top of another may be undefined in some examples. Accordingly, the plug-ins 114 may include nested plug-ins that include a parent or group plug-in 114-5 and one or more nested child plug-ins 114-6 that may be managed by the group plug-in 114-5. As one example, nested plug-ins 114-6 may occur when a container type of plug-in 114-5 contains other plug-ins 114-6. In the example of FIG. 7, the nested plug-ins include the group plug-in 114-5 and three child plug-ins 114-6, which may each render a nested layer 708 for the group plug-in 114-5. Thus, the group plug-in 114-5 may be configured to manage and/or direct events to the nested plug-ins 114-6. For example, the group plug-in 114-5 may pass control of rendering and events to the nested plug-ins. For instance, a scrollable plug-in that presents a scrollable window may have a plurality of nested plug-ins that present additional features or content in the scrollable window.

Figure 8:
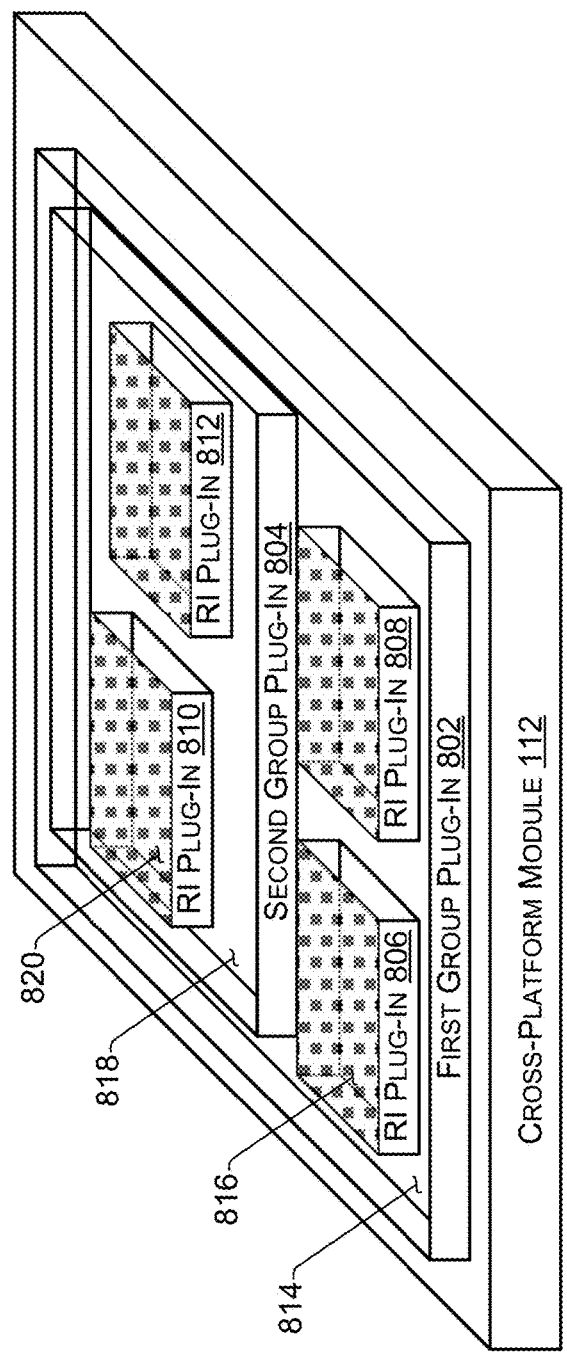
FIG. 8 illustrates an example arrangement of nested plug-ins according to some implementations.

FIG. 8 illustrates an example arrangement 800 of nested plug-ins according to some implementations. In this example, the arrangement 800 may be determined or defined by the content of the content item being rendered, and the plug-ins described may correspond to any of the cross-platform plug-ins 114 described above, or other suitable plug-ins. Thus, a first group plug-in 802 includes a second group plug-in 804 that is a nested group plug-in with respect to the first group plug-in 802. The first group plug-in 802 further includes a plurality of nested plug-ins 806 and 808. Furthermore, the second group plug-in 804 includes a plurality of nested plug-ins 810 and 812. Accordingly, in some cases, the plug-ins herein may be configured to include multiple hierarchical layers of group plug-ins and nested plug-ins.

In some examples, some or all of the nested plug-ins 806-812 may be renderable interactive (RI) plug-ins, which are plug-ins capable of receiving user interface events from the user and/or events from other plug-ins or from the content itself. For example, RI plug-ins may be able to render content on-screen and/or off screen, such as in a well-defined area on-screen. Thus, RI plug-ins typically may not be able to render content outside of their own designated areas. Furthermore, RI plug-ins may typically communicate with other RI plug-ins using a publish-subscribe event system, such as via an event handler as discussed above. In addition, if an RI plug-in is a child of a group plug-in, the RI plug-in may typically notify the parent group plug-in when the RI plug-in is not consuming an event. Several examples of RI plug-ins discussed above with respect to FIG. 3 include the panorama plug-in 320 for generating a panoramic view, and the image sequence plug-in 330 for generating a view of image sequences.

The group plug-ins 802 and 804 are typically special plug-ins that can contain RI plug-ins and/or other group plug-ins up to any arbitrary depth. The plug-ins conceptually maintained inside a particular group plug-in may be referred to herein as children or nested plug-ins. Further, while the plug-ins are illustrated and described as having a nested relationship with a particular group plug-in, the nested plug-ins are actually separate modules that are managed by the parent group plug-in according to a defined relationship, which may be defined by the content being presented in some cases.

As one example, suppose that a user makes an input to an area of a display corresponding to the first group plug-in 802. Examples of such inputs may include touch inputs, mouse clicks, or inputs made using any other suitable input device. For instance, the input may be to an area of the display managed by the first group plug-in 802, but outside of an area managed by or written to by any of the RI plug-ins 806 and 808 or the second group plug-in 804. Conceptually, for convenience of illustration, suppose that the input corresponds to a location 814 with respect to the first group plug-in 802. In response to receiving the input, the cross-platform module 112 may look for a plug-in located at or managing an area of the display corresponding to the position of the input, which in this example is the first group plug-in 802. The cross-platform module 112 may initiate a new UI transaction with the first group plug-in 802 such that all subsequent events relative to the new UI transaction are forwarded to the first group plug-in 802. In addition, the cross-platform module 112 may translate the UI coordinate system relative to the first group plug-in 802. The first group plug-in 802 may translate and/or scale its nested plug-ins, namely, RI plug-ins 806 and 808, and the second group plug-in 804, according to the desired user interface event. Consequently, each implementation of a group plug-in may be able to define its own mapping between a event, such as a gesture, and translation or scaling of its children plug-ins.

As another example, suppose that a user makes an input to an area of the display corresponding to the RI plug-in 806, as conceptually illustrated by the input 816. In this example, the cross-platform module 112 receives the event and looks for a plug-in located at the position corresponding to the user input, which in this case is the first group plug-in 802. The cross-platform module 112 may start a new UI transaction with the first group plug-in 802. The first group plug-in 802 looks for a plug-in located at a position on the display corresponding to the position 816 indicated by the cross-platform module 112. The first group plug-in 802 detects that the event is destined to the RI plug-in 806, and the first group plug-in 802 starts a new UI transaction with the RI plug-in 806. Subsequently, all events relative to the UI transaction are forwarded to the RI plug-in 806. For example, the cross-platform module may translate a UI coordinate system relative to the first group plug-in 802, and the first group plug-in 802 may translate the UI coordinate system relative to the RI plug-in 806. The RI plug-in 806 receives the event, and may perform a prescribed action in response to the event. For example, the RI plug-in 806 may compare the event with a predefined list of events for determining whether to consume the event. If the event matches an event in the list, the RI plug-in 806 may consume the event, such as by rendering output corresponding to the event. On the other hand, in response to the RI plug-in 806 determining that the event is absent from the predefined list of events, the RI plug-in 806 may decline to consume the event. If the RI plug-in 806 declines to consume the event, the first group plug-in 802 may consume the event, if appropriate, such as if the event matches one of the predefined events of the first group plug-in 802.

As another example, suppose that a user makes an input to an area of the display corresponding to the second group plug-in 804, as illustrated conceptually by the input location 818. The cross-platform module 112 may receive the event and look for a plug-in located at the position corresponding to the input 818. In this case, the plug-in recognized is the first group plug-in 802 and the cross-platform module 112 starts a new UI transaction with the first group plug-in 802 so that all events relative to this UI transaction are forwarded to the first group plug-in 802. Further, the cross-platform module 112 may translate the UI coordinate system relative to the first group plug-in 802. The first group plug-in 802 looks for a plug-in located at the position corresponding to position 818, and detects that the event is destined to the second group plug-in 804. The first group plug-in 802 starts a new UI transaction with the second group plug-in 804 and, subsequently, all events relative to this UI transaction are forwarded to the second group plug-in 804. Furthermore, the first group plug-in 802 translates the UI coordinate system relative to the second group plug-in 804. If the second group plug-in 804 consumes the event, the second group plug-in 804 may translate and/or scale its children according to the desired event. For example, each group plug-in is able to define its own mapping between a event and translation or scaling of any children contained therein.

As another example, suppose that a user makes an input to an area of the display corresponding to the RI plug-in 810, as indicated conceptually by the input location 820. The cross-platform module 112 may receive the event and look for a plug-in located at the position corresponding to the input 820. In this example, the plug-in recognized is the first group plug-in 802, and the cross-platform module 112 starts a new UI transaction with the first group plug-in 802. All events relative to this UI transaction may be forwarded to the first group plug-in 802 and the cross-platform module 112 may translate the UI coordinate system relative to the first group plug-in 802. The first group plug-in 802 looks for a plug-in located at the position corresponding to position 820, and detects that the event is destined to the second group plug-in 804. The first group plug-in 802 starts a new UI transaction with the second group plug-in 804 and, subsequently, all events relative to this UI transaction are forwarded to the second group plug-in 804. Furthermore, the first group plug-in 802 translates the UI coordinate system relative to the second group plug-in 804. The second group plug-in 804 looks for a plug-in located at the position corresponding to position 820, and detects that the event is destined to the RI plug-in 810. The second group plug-in 804 starts a new UI transaction with the RI plug-in 810 and, subsequently, all events relative to this UI transaction may be forwarded to the RI plug-in 810. Furthermore, the second group plug-in 804 may translate the UI coordinate system relative to the RI plug-in 810. The RI plug-in 810 receives the event and behaves according to the particular configuration of the RI plug-in 810. For example, the RI plug-in 810 may compare the event with a list of predefined events to determine whether not to consume the event. If the event matches or otherwise corresponds to an event on the list, the RI plug-in 810 may consume the event, such as by rendering content in accordance with the event. For instance, suppose that the event is a finger swipe in the area of the display corresponding to the RI plug-in 810, and finger swipes are included in the list of events to which the RI plug-in 810 will respond. In response to determining that there is a match, the RI plug-in 810 may render content appropriate for the finger swipe in near-real time, such as for a start position and a current position of the finger swipe. Alternatively, if the event is absent from the list or otherwise does not match events on the list, the RI plug-in 810 may decline to consume the event. If the RI plug-in 810 declines to consume the event, the second group plug-in 804 may consume the event if the event matches a predefined event for the second group plug-in 804. Alternatively, the first group plug-in 802 may consume the event if the second group plug-in 804 declines to consume the event.

Figure 9:
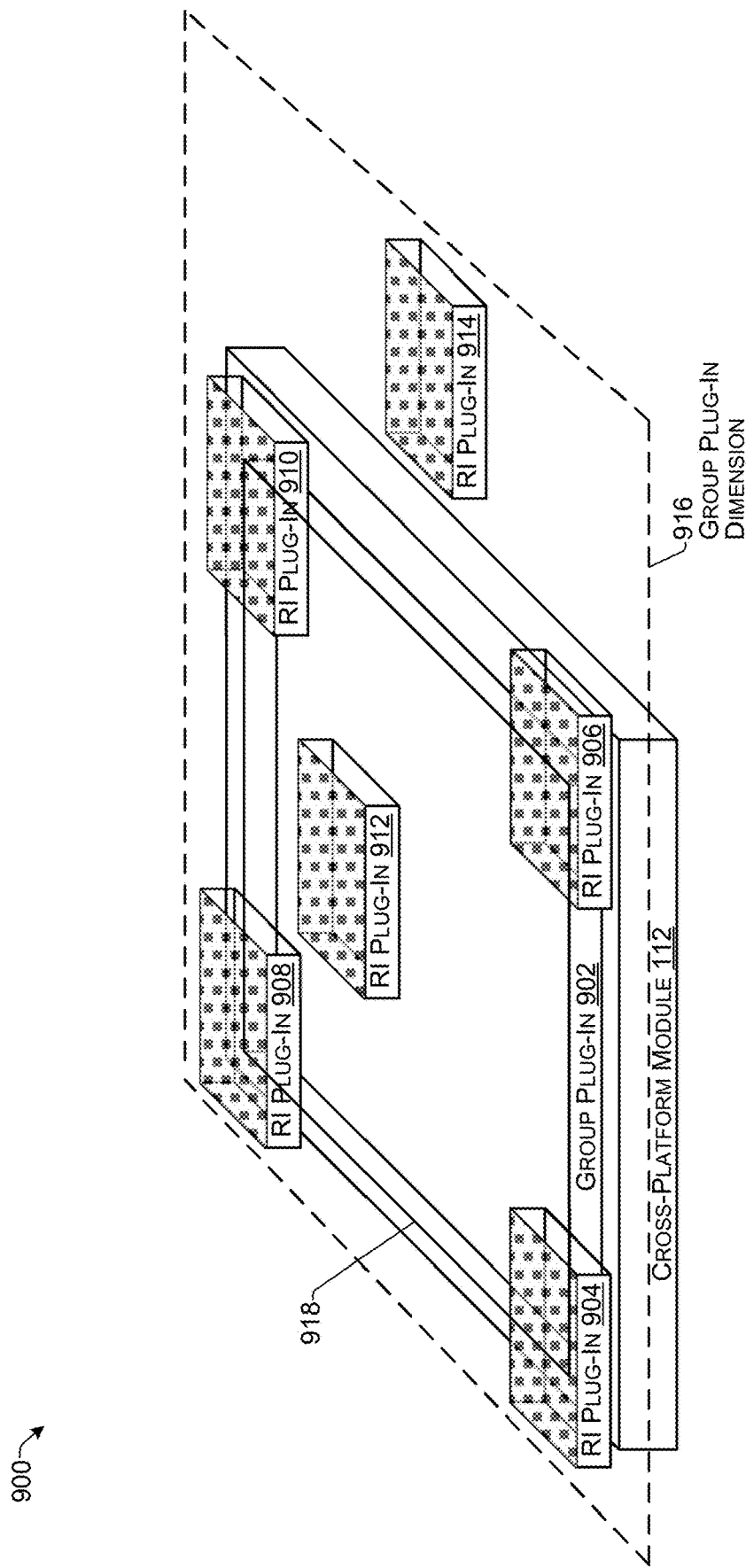
FIG. 9 illustrates an example group plug-in with an off screen plug-in according to some implementations.

FIG. 9 illustrates an example arrangement 900 including a group plug-in with an off screen nested plug-in according to some implementations. For instance, a group plug-in 902 may include a plurality of nested plug-ins including RI plug-ins 904, 906, 908, 910, 912 and 914. Accordingly, the group plug-in 902 may include a group plug-in dimension 916 corresponding to a rectangle around all of the children plug-ins 904-914. Accordingly, the rectangle 916 may have a dimension larger than a designed area 918 for the group plug-in 902. For instance, the designed area 918 may be the area that is actually rendered on the display. In some instances, the group plug-in 902 is restricted from rendering content outside of the designed area 918. Accordingly, in this example, the group plug-in 902 might not call a render method a child plug-in, such as RI plug-in 914, which is located outside the designed area 918. Additionally, for RI plug-ins 904-912, which are at least partially inside the designed area 918, the group plug-in 902 may call render methods for these children. However, the group plug-in 902 may crop the visual results of the children so that only the portions within the designed area 918 are presented with the output on the display.

Accordingly, based on this result, the output of RI plug-in 912 may be fully visible, the output of RI plug-ins 904, 906, 908 and 910 are partially visible such that only the common area between these plug-ins and the designed area 918 are presented on the display. Furthermore, the RI plug-in 914 is completely outside the designed area 918 and, therefore, is not rendered or does not have its rendered method called. Accordingly, the group plug-in 902 may forward events to the RI plug-ins 904-912. Any events not consumed by the children 904-912 may be consumed by the group plug-in 902, such as for relocating the position of the children 904-914. Typically, the group plug-in 902 may define a default implementation that includes event redirection to the children plug-ins, mapping between events and translation or scaling of the children. Other plug-ins may be able to subclass or nest the group plug-in 902 such as for redefining event redirection.

Figure 10:
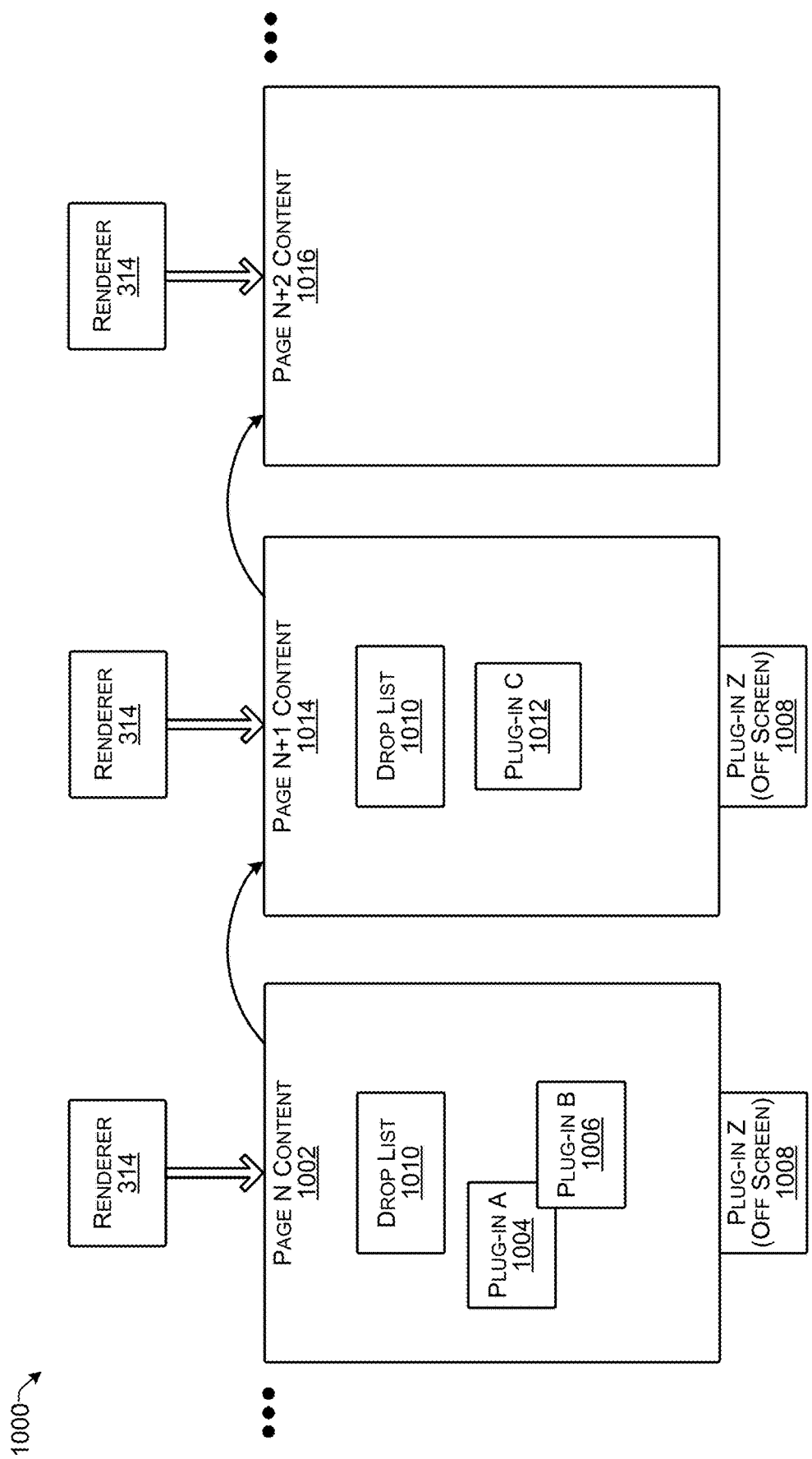
FIG. 10 illustrates example interactions of plug-in layers created as Z-levels according to some implementations.

FIG. 10 illustrates an example page rendering sequence 1000 including plug-in layers created as specific Z levels by a renderer plug-in according to some implementations. For example, some plug-ins 114 may be able to create, update and/or delete plug-in layers. As one example, the renderer plug-in 314, discussed above with respect to FIG. 3, may be responsible for rendering the main or primary content of a content item. Furthermore, this plug-in may create additional plug-in layers, such as in a case where the renderer may need to overlay an element it is rendering on top of a plug-in that it is not capable of rendering.

The renderer plug-in 314 may create other plug-in layers at specific Z-axis levels as dictated by a layout of the content. For example, the renderer plug-in 314 may be able to create another plug-in layer at any time by using a "create plug-in layer" interface. This can cause the creation of a handle, which is used by the renderer plug-in 314 to manage the created plug-in layer. For example, the renderer plug-in 314 may be able to move the corresponding elements in real time using an "update plug-in" interface. Furthermore, when an instance of a plug-in layer is no longer needed, the renderer plug-in may delete the plug-in layer.

In the example of FIG. 10, a first page of content, page N content 1002, may be rendered by the renderer plug-in 314. In addition, the renderer plug-in 314 may create additional content plug-in layers such as for a plug-in A 1004, a plug-in B 1006, and an off-screen plug-in Z 1008. These three plug-ins 1004-1008 may be handled external to the renderer 314, while a drop list 1010 may be handled by the renderer plug-in 314, but subsequent to the rendering of the plug-ins 1004-1008. Accordingly, the rendering loop may render the page content 1002, the plug-ins 1004 and 1006, and then subsequently the renderer plug-in 314 may further render the drop list 1010.

When a turn page event is received to advance to page N+1, the content may dictate that the plug-ins A and B are to be removed, and a plug-in C 1012 is to be added. Consequently, the renderer plug-in 314 may delete the layers corresponding to plug-in A and plug-in B, and may add a new layer corresponding to plug-in C 1012. Accordingly, in the rendering loop, the renderer 314 may render the page N+1 content, plug-in C may render the plug-ins C content, and the renderer 314 may render the drop list 1010. The off-screen plug-in Z 1008 (e.g., an audio plug-in or other off-screen content plug-in) may exist longer than page N, and thus, the renderer 314 does not delete this plug-in on transition to the page N+1. Subsequently, when a next page turn event for advancing to page N+2 is received, if the drop list 1010, the plug-in C 1012 and the plug-in Z 1008 are no longer called for by the content, the renderer 314 may delete the layers for these plug-ins, and merely render the page N+2 content 1016.

Furthermore, in the case where the layout of the content is dynamic, the renderer plug-in 314 may control the position of the images rendered by the plug-ins, such as by moving an image rendered by one plug-in relative to another. In some instances, the renderer plug-in 314 may update the plug-in positions during a transition similar to that discussed above with respect to FIG. 6 B.

Figure 11:
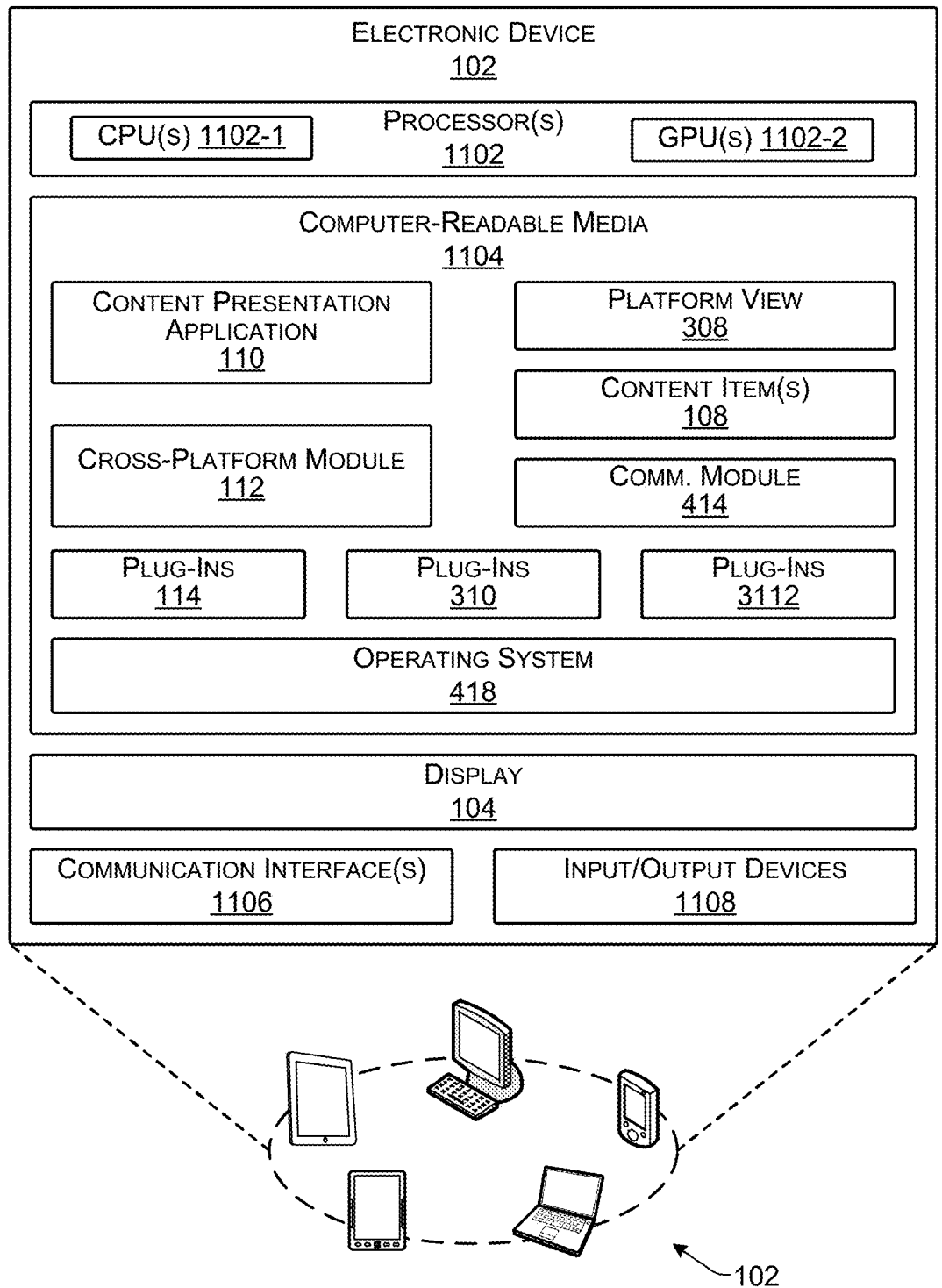
FIG. 11 illustrates select components of an example electronic device according to some implementations.

FIG. 11 illustrates select components of an example electronic device 102 according to some implementations. The electronic device 102 may be implemented as any of a number of different types of electronic devices, some examples of which are described above with reference to FIG. 1. In a very basic configuration, the electronic device 102 includes, or accesses, components such as at least one control logic circuit, central processing unit, or processor 1102, and one or more computer-readable media 1104. Each processor 1102 may itself comprise one or more processors or processing cores. For example, the processor 1102 can be implemented as one or more microprocessors, microcomputers, microcontrollers, digital signal processors, central processing units, graphics processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable instructions stored in the computer-readable media 1104.

In some examples, the processors 1102 may include one or more CPUs 1102-1 and one or more GPUs 1102-2. For instance, the GPU(s) 1102-2 may primarily handle the rendering of images, such as in association with the rendering and compositing API(s) 124 discussed above. Further, in some examples, certain content items 108 that include substantial rendering processing may be componentized in advance, such as by a content provider (e.g., corresponding to the distribution service 408 of FIG. 4). For instance, the content of the content item 108 may be componentized into two pipelines, a first pipeline for components such as text, audio and vector graphics that may be rendered by the CPU 1102-1, and a second pipeline for other components that are rendered by the GPU 1102-2. Further, the plug-ins 114, 310 or 352 may also be sorted in a similar manner, e.g., certain plug-ins such as an audio player may be designated for execution substantially by the CPU, while a plug-in that displays a 3D model may be designated for execution substantially on the GPU. This componentization of the content and sorting of the plug-ins may result in better overall performance than if componentization is not used. As one example, the content item 108 may include a mapping of content, such that certain portions of the content are mapped to certain plug-ins. Further, those plug-ins may be designated for execution by either the GPU or the CPU. Consequently, the content may be mapped in advance for execution by the GPU or the CPU based on the plug-in that will be used to present that content.

Depending on the configuration of the electronic device 102, the computer-readable media 1104 may be an example of tangible non-transitory computer-readable media and may include volatile and nonvolatile memory and/or removable and non-removable media implemented in any type of technology for storage of information such as computer-readable instructions, data structures, program modules or other data. The computer-readable media 1104 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 102 may access external storage, such as a connected host computer, RAID storage systems, storage arrays, network attached storage, storage area networks, cloud storage, or any other medium that can be used to store information and that can be accessed by the processor 1102 directly or through another computing device or network. Accordingly, the computer-readable media 1104 may include computer storage media able to store instructions, modules or components that may be executed by the processor 1102.

The computer-readable media 1104 may be used to store and maintain any number of functional components that are executable by the processor 1102. In some implementations, these functional components comprise instructions or programs that are executable by the processor(s) 1102 and that, when executed, implement operational logic for performing the actions attributed above to the electronic device 102. Functional components of the electronic device 102 stored in the computer-readable media 1104 may include the content presentation module 110, the cross-platform module 112, the platform view 308, the plug-ins 114, 310 and 352, the communication module 414, and the OS 418.

In addition, the computer-readable media 1104 may also store data, data structures and the like, that are used by the functional components. For example, data stored by the computer-readable media 1104 may include one or more content items 108. Depending on the type of the electronic device 102, the computer-readable media 1104 may also optionally include other functional components and data, which may include programs, drivers and so forth, and the data used by the functional components. Further, the electronic device 102 may include many other logical, programmatic and physical components, of which those described are merely examples that are related to the discussion herein.

FIG. 11 further illustrates the display 104, which may be passive, emissive or any other form of display. In some cases, the display 104 may be an electronic paper display or electronic ink display, such as an electrophoretic or electrowetting display. Other examples of the display 104 may include bi-stable LCD displays, micro electromechanical system (MEMS) displays, such as interferometric modulator displays, cholesteric displays, electrofluidic pixel displays, photonic ink displays, gyricon displays, and the like. In other implementations, or for other types of devices, the display 104 may be an active display such as a liquid crystal display, a plasma display, a light emitting diode display, an OLED (organic light-emitting diode) display, or any other suitable type of display able to present rendered content thereon. Accordingly, implementations herein are not limited to any particular display technology.

The electronic device 102 may further include one or more communication interfaces 1106, which may support both wired and wireless connection to various networks, such as cellular networks, radio, Wi-Fi networks, close-range wireless connections, near-field connections, infrared signals, local area networks, wide area networks, the Internet, and so forth. The communication interfaces 1106 may further allow a user to access storage on or through another device, such as a network attached storage device, cloud storage, or the like.

The electronic device 102 may further be equipped with various other input/output (I/O) components 1108. Such I/O components 1108 may include a touchscreen and various user controls (e.g., buttons, a joystick, a keyboard, a mouse, a keypad, etc.), connection ports, and so forth. In some examples, in addition to or instead of the display 104, the rendered and composited content herein may be output to various types of output devices 1108, such as a printer, a monitor, a projector, speakers, a virtual reality helmet, and so forth. Further, in some types of devices, the I/O components may include various sensors, such as an accelerometer, a gyroscope, a Global Positioning System device, a compass, or various other sensing components that may be used to detect a change in a location or a change in an orientation of the electronic device 102. Additionally, the electronic device 102 may include various other components that are not shown, examples of which include removable storage, a power source, such as a battery and power control unit, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 12:
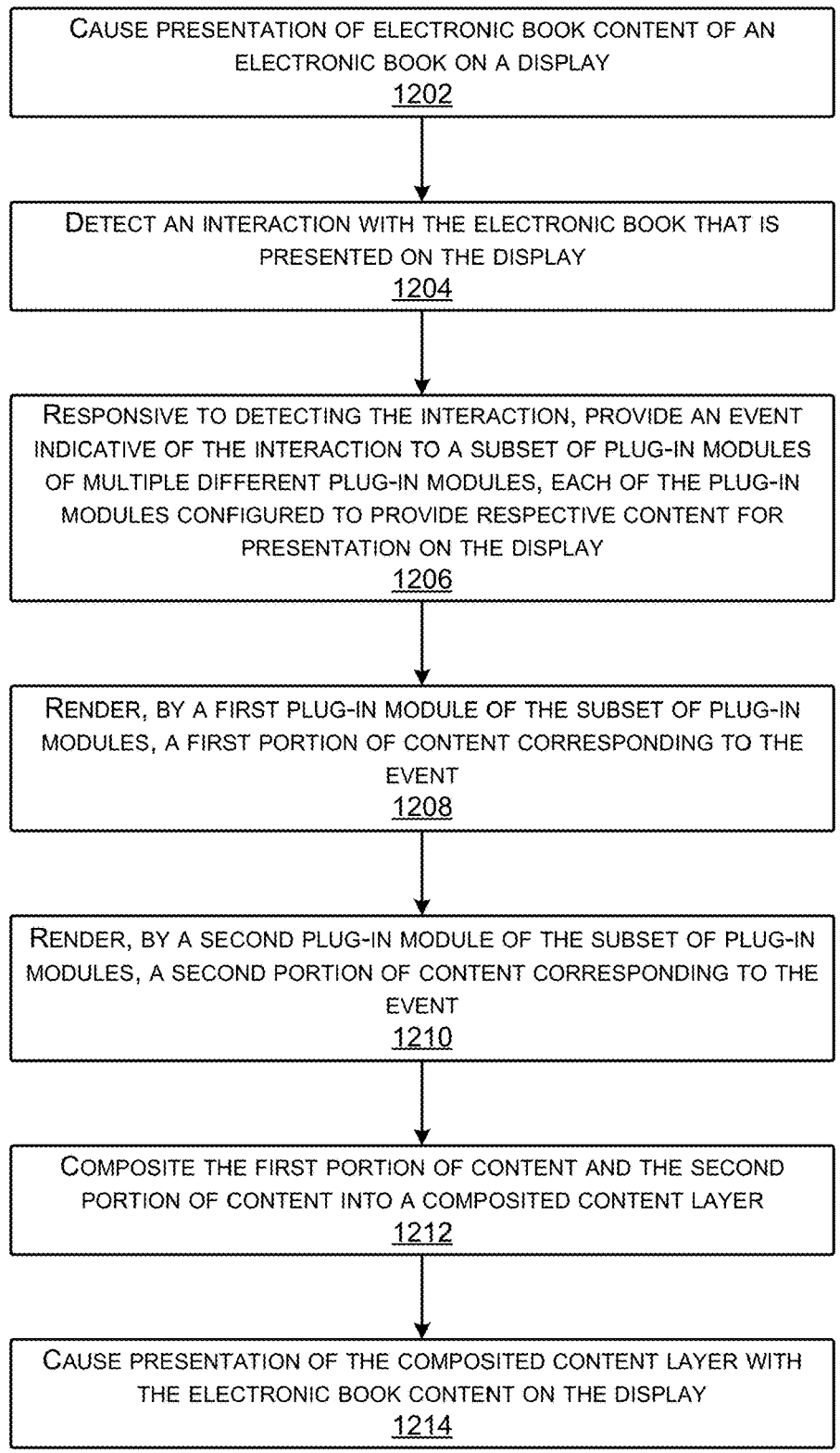
FIG. 12 is a flow diagram illustrating an example process for presenting content on an electronic device according to some implementations.
Figure 13:
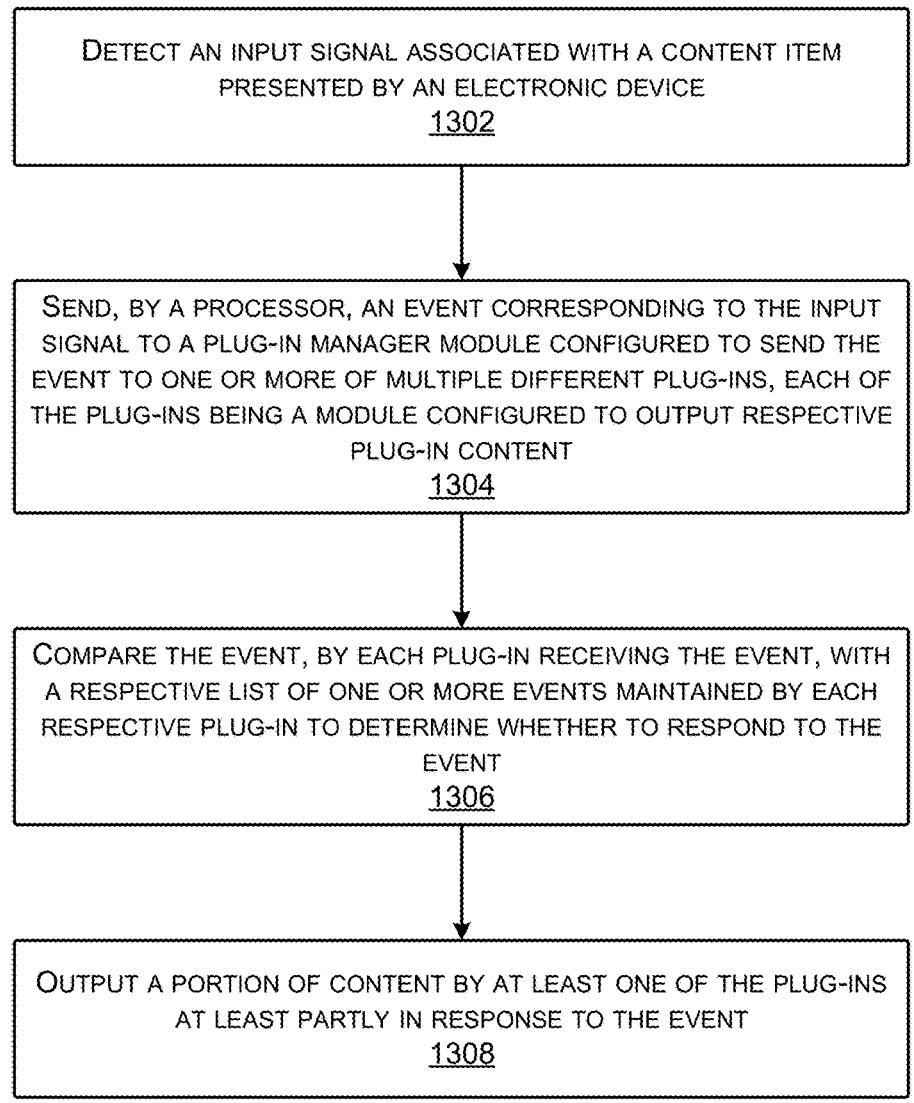
FIG. 13 is a flow diagram illustrating an example process for presenting content on an electronic device according to some implementations.
Figure 14:
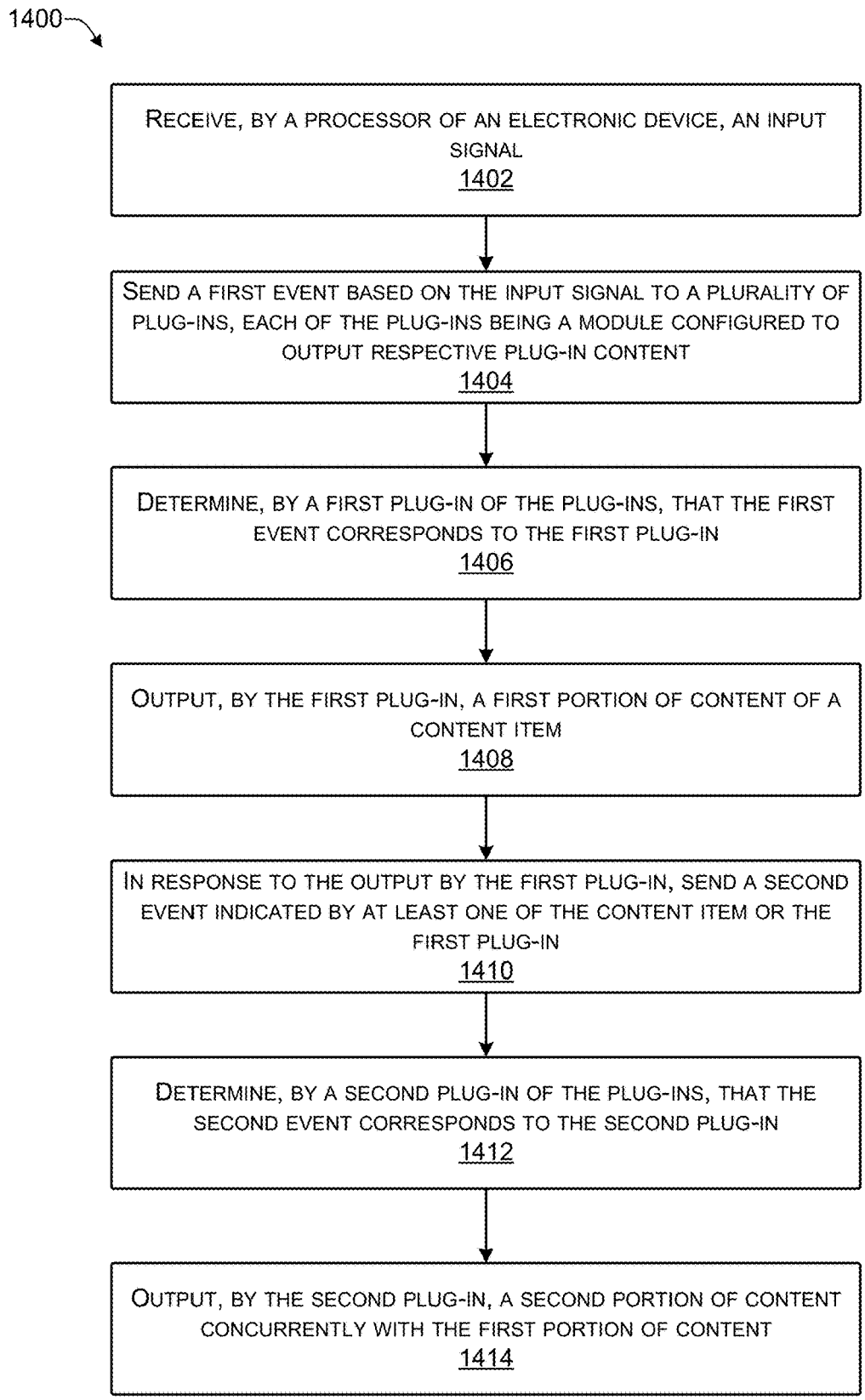
FIG. 14 is a flow diagram illustrating an example process for presenting content on an electronic device according to some implementations.

FIGS. 12-14 illustrate example processes according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 12 is a flow diagram illustrating an example process 1200 that may be executed by an electronic device according to some implementations.

At 1202, the electronic device presents electronic book content of an electronic book on a display. For example, a user input or other input signal may cause presentation of the main text content of the electronic book on the display. In some examples, one or more plug-ins may perform rendering functions for rendering the electronic book content for presentation on the display.

At 1204, the electronic device detects an interaction with the electronic book that is presented on the display. For example, the electronic device may detect a user input, or the like, for interacting with a portion of displayed content of an electronic book. In some cases, the interaction may include at least one of a user request to turn a page in the electronic book; a user selection of text of the electronic book; a user selection of an icon presented on the display; a user adjustment of a setting for presenting the electronic book; a user input via an input device; a change in an orientation of the device, a change in a location of the device, or various other types of interactions that may generate or may be used to generate an event. Furthermore, in some examples, events may be generated based on other types of input signals, such as passage of time, an input signal from a plug-in, or other module or application of the electronic device, an input signal from the content of the electronic book, and so forth.

At 1206, responsive to detecting the interaction, the electronic device provides an event indicative of the interaction to a subset of plug-in modules of multiple different plug-in modules, each plug-in module of the multiple different plug-in modules being configured to provide content for presentation on the display. For example, a plurality of different plug-in modules may be provided for rendering various different types of enhanced content features in addition to the main content of the electronic book.

At 1208, a first plug-in module of the subset of plug-in modules renders a first portion of content corresponding to the event. For example, the first plug-in module may render a first portion of a page of content, such as a main portion of content.

At 1210, a second plug-in module of the subset of plug-in modules renders a second portion of content corresponding to the event. For example, the second plug-in module may be configured to render a second portion of content, different from the first portion. As one example, the second portion of content may be rendered for presentation with the main portion of content, and may provide a content-enhancing feature.

At 1212, the electronic device composites the first portion of content and the second portion of content into a composited content layer. For example, the electronic device may access one or more cross-platform-compatible rendering and compositing API(s) to ensure that the composited content layer is compatible with a particular OS platform. In some cases, the first plug-in module may render the first portion of content to a first rendering layer and the second plug-in module may render the second portion of content to a second rendering layer that is separate from the first rendering layer. Subsequently, the compositing may include compositing the first rendering layer with the second rendering layer to create the composited content layer, and storing the composited content layer in a buffer.

At 1214, the electronic device causes presentation of the composited content layer on the display. For example, the composited content layer may be further composited with at least one of an image rendered by an operating system of the electronic device, or an image rendered by a presentation application on the electronic device and presented on the display, or output to another type of output device.

FIG. 13 is a flow diagram illustrating an example process 1300 that may be executed, at least in part, by an electronic device according to some implementations.

At 1302, the electronic device detects an input signal associated with a content item presented on or by an electronic device. For example, the operating system may detect an input signal, such as a user input with respect to a content item, as an event to be sent to the cross-platform module. Alternatively, the content of the content item, one of the plug-ins, or another module or application on the electronic device, may generate or provide an input signal as an event to be sent to the cross-platform module.

At 1304, the electronic device may send an event corresponding to the input signal to a plug-in manager module configured to send the event to one or more of multiple different plug-ins. Each of the plug-ins may be a module configured to output respective plug-in content on the electronic device in response to one or more predefined events. In some examples, the plug-in manager module directs the event to a subset of the multiple plug-ins that are selected based on at least one of a characteristic of the interaction; a characteristic of the user; a characteristic of the content item; or a characteristic of the electronic device.

At 1306, each plug-in receiving the event, may compare the event with a respective list of one or more events maintained by each respective plug-in to determine whether to respond to the event. For example, if the event is a user input, the event may indicate a type of gesture received and a location of the gesture, e.g., on a display. As one example, if the location corresponds to a display location at which a particular plug-in outputs content, the particular plug-in may respond to the event by rendering content for presentation at the display location. In other examples, the event may be an input signal from the content item, such as an instruction for a particular type of plug-in to render particular content to a particular location on the display or other output image. In still other examples, the event may be an input signal from another plug-in, such as for coordinating rendering of content to a particular location on the display. As one example, a plug-in rendering a window with the content may send an input signal as an event for a button plug-in to render a button for presentation in the window. In general, a plug-in may respond to an event that includes information corresponding to a list of events maintained by the plug-in. For example, if the event is for a display location to which the plug-in is currently rendering content, and is for a gesture included in the list of events maintained by the plug-in, the plug may determine to consume the event and render content based on the event. Alternatively, if the event does not match an event in the list of events maintained by the plug-in, the plug-in may ignore the event.

At 1308, the electronic device may output a portion of content rendered by at least one plug-in of the multiple different plug-ins at least partly in response to the event. In some cases, a first one of the plug-ins outputs a first content portion to a first area of a display and a second one of the plug-ins outputs a second content portion to a second area of the display. As one example, the event may be direct to the first plug-in based at least in part on detecting the interaction at the first area of the display, the first plug-in may render a portion of the content, and the first plug-in may generate an input signal as a second event to another plug-in to render another portion of the content.

FIG. 14 is a flow diagram illustrating an example process 1400 that may be executed, at least in part, by an electronic device according to some implementations.

At 1402, a processor of an electronic device receives an input signal. As discussed above, the input signal may be from a user input, from a content item, from a plug-in, or from another module or application on the electronic device, such as the presentation application.

At 1404, the electronic device sends a first event based on the input signal to a plurality of plug-ins. Each of the plug-ins may be a module configured to output respective plug-in content.

At 1406, a first plug-in of the plurality of plug-ins may determine that the first event corresponds to the first plug-in. For example, the first plug-in may compare the event with a list of one or more events maintained by the first plug-in and a location on the display, if any, corresponding to the event. Alternatively, in other examples, the plug-in manager may direct the event to the first plug-in, such as based on a list maintained by the plug-in manager and/or a location on the display, if any.

At 1408, the first plug-in may output a first portion of content, such as by rendering the first portion of content to a buffer.

At 1410, in response to the output by the first plug-in, a second event indicated by at least one of the content item or the first plug-in is sent to one or more of the plug-ins. For example, the content item may indicate one or more events, such as providing instructions for a particular plug-in to render particular content at a particular portion of a display concurrently with the presentation of the first portion of content. Additionally, or alternatively, the first plug-in may send an event to be consumed by another plug-in.

At 1412, a second plug-in of the plurality of plug-ins may determine that the second event corresponds to the second plug-in. For example, the second plug-in may refer to a list of events maintained by the second plug-in to determine if the event and location, if any, match the list of events maintained by the second plug-in.

At 1414, the second plug-in outputs a second portion of content on the display concurrently with the first portion of content at least partly in response to determining that the event corresponds to the second plug-in. For example, the second event may instruct the second plug-in to be used to output particular identified content of the content item. In some examples, the first portion of content may be the main content of the content item, and the second portion of content may be additional content that enhances the main content. In other examples, the first portion of content may be a widow or widget that includes the portion of content output by the second plug-in.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
   a display;
   one or more processors; and
   one or more non-transitory computer-readable media maintaining instructions which, when executed by the one or more processors, cause the one or more processors to perform functions comprising:
      executing an operating system on the electronic device, the electronic device being a type of a plurality of types of electronic devices that each execute different ones of a plurality of operating systems that include the operating system;
      causing presentation of content on the display, the content including a first portion and a second portion of a plurality of portions;
      detecting an interaction with at least one of the first portion or the second portion of the content, resulting in an interacted portion, and generating an event associated with the interacted portion;
      responsive to detecting the interaction, causing an operating system specific module to provide the event to:
         a first plug-in module that is supported by the operating system and other operating systems of the plurality of operating systems that are different than the operating system of the electronic device, the first plug-in module further configured to provide a first rendering of the interacted portion based at least in part on either a first determination that the first plug-in module meets first defined criteria to process the event to render the first portion or a second determination that the first plug-in module does not meet second defined criteria to process the event to render the second portion based at least in part on the type of the electronic device; and
         a second plug-in module that is specific to the operating system on the electronic device, the second plug-in module further configured to provide a second rendering of the interacted portion based at least in part on a third determination that the second plug-in module meets third defined criteria to process the event to render the second portion based at least in part on the type of the electronic device;

rendering, based at least in part on the first determination that the first plug-in module meets the first defined criteria and the first plug-in module processing the event, the first portion;

rendering, based at least in part on the third determination that the second plug-in module meets the third defined criteria and the second plug-in module processing the event, the second portion;

compositing the first portion and the second portion into a composited content layer; and causing presentation of the composited content layer on the display.

2. The electronic device as recited in claim 1, wherein the content is presented by an application executing on the electronic device, and wherein the first plug-in module, the second plug-in module, and the operating system specific module are components of the application.

3. The electronic device as recited in claim 1, wherein:
the rendering by the first plug-in module comprises rendering the first portion to a first rendering layer;
the rendering by the second plug-in module comprises rendering the second portion to a second rendering layer that is separate from the first rendering layer;
the compositing comprises compositing the first rendering layer with the second rendering layer to create the composited content layer; and
the functions further comprising storing the composited content layer in a buffer.

4. The electronic device as recited in claim 1, wherein the event is a cross-operating system event configured to be recognized by modules supported by the plurality of operating systems.

5. The electronic device as recited in claim 1, wherein the first plug-in module is a nested plug-in module that receives the event from a group plug-in module, the functions further comprising:
determining, by the group plug-in module, that the first plug-in module corresponds to a display location associated with the event; and
sending, by the group plug-in module, the event to the first plug-in module.

6. A method comprising:
receiving, by an application executing on an electronic device, an input signal associated with a content item presented by the electronic device, the electronic device executing an operating system, and the electronic device being a type of a plurality of types of electronic devices that execute different ones of a plurality operating systems that include the operating system;
causing presentation of the content item on a display of the electronic device, the content item including a first portion and a second portion of a plurality of portions;
detecting an interaction with at least one of the first portion or the second portion of the content item, resulting in an interacted portion, and generating an event associated with the interacted portion;
sending, by the application, the event to a plug-in manager module configured to send the event to one or more of multiple different plug-ins, individual ones of the multiple different plug-ins being a module configured to output respective plug-in content;
sending, by the plug-in manager module, the event to:
a first plug-in module that is supported by the operating system and other operating systems of the plurality of operating systems that are different than the operating system of the electronic device, the first plug-in module further configured to provide a first rendering of the interacted portion based at least in part on either a first determination that the first plug-in module meets first defined criteria to process the event to render the first portion or a second determination that the first plug-in module does not meet second defined criteria to process the event to render the second portion based at least in part on the type of the electronic device; and
a second plug-in module that is specific to the operating system on the electronic device, the second plug-in module further configured to provide a second rendering of the interacted portion based at least in part on a third determination that the second plug-in module meets third defined criteria to process the event to render the second portion based at least in part on the type of the electronic device;
rendering, based at least in part on the first determination that the first plug-in module meets the first defined criteria and the first plug-in module and processing the event, the first portion;
rendering, based at least in part on the third determination that the second plug-in module meets the third defined criteria and the second plug-in module processing the event, the second portion;
compositing the first portion and the second portion into a composited content layer; and
causing presentation of the composited content layer with the content item on the display.

7. The method as recited in claim 6, further comprising comparing the event, by the second plug-in module, to a list of one or more events maintained by the second plug-in module to determine whether to respond to the event; and
wherein the second plug-in module renders the second portion based on the comparing of the event to the list.

8. The method as recited in claim 6, wherein the first portion is rendered by the first plug-in module to a first operating system layer, and the second portion is rendered by the second plug-in module to a second operating system layer, the first operating system layer being different from the second operating system layer.

9. The method as recited in claim 6, further comprising:
determining that the input signal is associated with a region of the display; and
wherein the event is sent to the plug-in manager module based at least in part on the plug-in manager module being associated with the region of the display.

10. The method as recited in claim 6, wherein the rendering of the first portion comprises rendering the first portion using a cross-language, multi-operating system, rendering application programming interface (API).

11. The method as recited in claim 6, wherein the content item is presented by the application, and wherein the first plug-in module, the second plug-in module, and the plug-in manager module are components of the application.

12. The method as recited in claim 6, wherein the application further comprises one or more cross-platform-compatible rendering and compositing application programming interfaces (APIs).

13. The method as recited in claim 6, wherein the first plug-in module is a nested plug-in that receives the event from a group plug-in of the multiple different plug-ins, and further comprising:
    determining, by the group plug-in, that the first plug-in module corresponds to a display location associated with the event; and
    sending, by the group plug-in, the event to the first plug-in module.

14. A method comprising:
    receiving, by an application executing on an electronic device, an input signal, the electronic device executing an operating system, and the electronic device being a type of a plurality of types of electronic devices that execute different ones of a plurality operating systems that include the operating system;
    causing presentation of content associated with the input signal on a display of the electronic device, the content including a first portion and a second portion of a plurality of portions;
    detecting an interaction with at least one of the first portion or the second portion of the content, resulting in an interacted portion, and generating an event associated with the interacted portion;
    sending, by the application, the event based on the input signal to a plurality of plug-in components of the application, individual plug-in components of the plurality of plug-in components being a module configured to output respective plug-in content, the plurality of plug-in components including:
        a first plug-in that is supported by the operating system and other operating systems of the plurality of operating systems that are different than the operating system of the electronic device, the first plug-in configured to provide a first rendering of the interacted portion based at least in part on either a first determination that the first plug-in meets first defined criteria to process the event to render the first portion or a second determination that the first plug-in does not meet second defined criteria to process the event to render the second portion based at least in part on the type of the electronic device; and
        a second plug-in that is specific to the operating system on the electronic device, the second plug-in configured to provide a second rendering of the interacted portion based at least in part on a third determination that the second plug-in module meets third defined criteria to process the event to render the second portion based at least in part on the type of the electronic device;
    rendering, based at least in part on the first determination that the first plug-in meets the first defined criteria and the first plug-in processing the event, the first portion;
    rendering, based at least in part on the third determination that the second plug-in meets the third defined criteria and the second plug-in processing the event, the second portion;
    compositing the first portion and the second portion into a composited content layer; and
    causing presentation of the composited content layer on the display.

15. The method as recited in claim 14 further comprising:
    rendering the first portion substantially by a central processing unit of the electronic device; and
    rendering the second portion substantially by a graphics processing unit of the electronic device.

16. The method as recited in claim 14, wherein the event is a cross-operating system event configured to be recognized by modules supported by the plurality of operating systems.

17. The method as recited in claim 14, wherein the rendering the first portion and the rendering the second portion further comprises:
    rendering, by the first plug-in, the first portion to a first rendering layer;
    rendering, by the second plug-in, the second portion to a second rendering layer that is separate from the first rendering layer;
    compositing the first rendering layer with the second rendering layer to create the composited layer; and
    outputting the composited layer to at least one of the display or a printer.

18. The method as recited in claim 17, wherein the first rendering layer and the second rendering layer are composited by a cross-platform-compatible compositing application programming interface (API) component of the application.

19. The method as recited in claim 17, wherein the first plug-in is a nested plug-in that receives the event from a group plug-in, and further comprising:
    determining, by the group plug-in, that the first plug-in corresponds to a display location associated with the event; and
    sending, by the group plug-in, the event to the first plug-in.

20. The method as recited in claim 19, wherein the group plug-in is a first group plug-in, and the first plug-in is a second group plug-in, and further comprising:
    determining, by the second group plug-in, that a third plug-in corresponds to the display location associated with the event; and
    sending, by the second group plug-in, the event to the third plug-in.

* * * * *